US011626909B2

(12) United States Patent
Rimalapudi et al.

(10) Patent No.: US 11,626,909 B2
(45) Date of Patent: Apr. 11, 2023

(54) METHOD AND DEVICE FOR ENHANCING POWER OF SIGNAL IN WIRELESS COMMUNICATION SYSTEM USING IRS

(71) Applicant: Samsung Electronics Co., Ltd., Suwon-si (KR)

(72) Inventors: Sarvendranath Rimalapudi, Bangalore (IN); Ashok Kumar Reddy Chavva, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/502,698

(22) Filed: Oct. 15, 2021

(65) Prior Publication Data

US 2022/0123803 A1 Apr. 21, 2022

Related U.S. Application Data

(63) Continuation of application No. PCT/KR2021/014249, filed on Oct. 14, 2021.

(30) Foreign Application Priority Data

Oct. 15, 2020 (IN) .............................. 202041044904
Sep. 30, 2021 (IN) .............................. 2020 41044904

(51) Int. Cl.
*H04B 7/06* (2006.01)
*H04B 17/13* (2015.01)

(52) U.S. Cl.
CPC ............. *H04B 7/061* (2013.01); *H04B 7/063* (2013.01); *H04B 7/0626* (2013.01); *H04B 17/13* (2015.01)

(58) Field of Classification Search
CPC .... H04B 7/0456; H04B 7/0608; H04B 7/061; H04B 7/145; H04B 17/13; H04B 7/0626; H04B 7/063; H01Q 15/147; H01Q 15/148
See application file for complete search history.

(56) References Cited

U.S. PATENT DOCUMENTS

2019/0181560 A1   6/2019  Sridharan et al.
2022/0077919 A1*  3/2022  Li ....................... H04B 7/0617

FOREIGN PATENT DOCUMENTS

CN         111211824 A         5/2020
WO    WO-2021207748 A2 *    10/2021

OTHER PUBLICATIONS

Wang et al. "Channel Estimation for Intelligent Reflecting Surface Assisted Multiuser Communications", Jun. 19, 2020, 2020 IEEE Wireless Communications and Networking Conference (WCNC). (Year: 2020).*

(Continued)

*Primary Examiner* — Sophia Vlahos
(74) *Attorney, Agent, or Firm* — Jefferson IP Law, LLP

(57) ABSTRACT

A method for enhancing receiving signal power at a receiver is provided. The method includes estimating a channel gain by transmitting a pilot signal to the receiver through each antenna from a plurality of antennas of a transmitter and an IRS, determining an antenna selection metric based on the channel gain in transmitting the pilot signal to the receiver through each antenna of the transmitter and the IRS, identifying an antenna from the plurality of antennas that causes to provide the largest antenna selection metric, determining a reflection coefficient for each reflector of the IRS based on the identified antenna, configuring the reflectors of the IRS with the reflection coefficient, and transmitting the signal to the receiver through the identified antenna and the configured reflectors.

20 Claims, 14 Drawing Sheets

(56) References Cited

OTHER PUBLICATIONS

You et al.; Channel Estimation and Passive Beamfomning for Intelligent Reflecting Surface Discrete Phase Shift and Progressive Refinement; Cornell University; arXiv:1912.10646v2 [cs.IT]; Mar. 24, 2020.

Wang et al.; Energy Efficiency Optimization in IRS-Enhanced mmWave Systems with Lens Antenna Array; Cornell University; arXiv:2007.00986v1 [eess.SP]; Jul. 2, 2020.

Yang et al.; Intelligent Reflecting Surface Meets OFDM: Protocol Design and Rate Maximization; Cornell University; arXiv:1906.09956v2 [cs.IT]; Nov. 22, 2019.

Taha et al.; Deep Reinforcement Learning for Intelligent Reflecting Surfaces: Towards Standalone Operation; Cornell University; arXiv:2002.11101v1 [cs.IT]; Feb. 25, 2020.

International Search Report and Written Opinion dated Jan. 21, 2022; International Appln. No. PCT/KR2021/014249.

Jiayi Zhang et al, "Prospective multiple antenna technologies for beyond 5G", Aug. 2020.

Qingqing Wu et al, "Towards Smart and Reconfigurable Environment: Intelligent Reflecting Surface Aided Wireless Network", Jan. 2020.

Xianghao Yu et al, "Optimal Beamforming for MISO Communications via Intelligent Reflecting Surfaces", May 2020.

Yutan Gao et al, "Reconfigurable Intelligent Surface for MISO Systems with Proportional Rate Constraints", Jun. 2020.

Minchae Jung et al, "Asymptotic optimality of reconfigurable intelligent surfaces: Passive beamforming and achievable rate", Jun. 2020.

Deepak Mishra, "Channel estimation and low-complexity beamforming design for passive intelligent surface assisted MISO wireless energy transfer", May 2019.

Beixiong Zheng et al, "Intelligent Reflecting Surface-Enhanced OFDM: Channel Estimation and Reflection Optimization", IEEE Wireless Communications Letters, vol. 9, No. 4, Apr. 2020.

Seong Taek Chung et al, "Degrees of freedom in adaptive modulation: A unified view", IEEE Transactions on Communications, vol. 49, No. 9, Sep. 2001.

P.-A. Absil et al, "Optimization Algorithms on Matrix Manifolds", Jun. 18, 2007.

* cited by examiner

METHOD AND DEVICE FOR ENHANCING POWER OF SIGNAL IN WIRELESS COMMUNICATION SYSTEM USING IRS

CROSS-REFERENCE TO RELATED APPLICATION(S)

This application is a continuation application of International application No. PCT/KR2021/014249, filed on Oct. 14, 2021, which is based on and claims the benefit of an Indian provisional patent application number 202041044904, filed on Oct. 15, 2020 in the Indian Patent Office, and of an Indian Complete patent application number 202041044904, filed on Sep. 30, 2021 in the Indian Patent Office, the disclosure of each of which is incorporated by reference herein in its entirety.

FIELD OF INVENTION

The disclosure relates to a wireless communication system. More particularly, the disclosure relates to a method and a device for enhancing power of a signal in the wireless communication system using an intelligent reflecting surface (IRS).

BACKGROUND

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

The 6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement the 6G communication systems in a terahertz band (for example, 95 GHz to 3THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for the 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in the 6G communication systems, developing mecahnisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through the 6G communication systems. In addition, services such as remote surgery for security and reliability enhancement, industrial automation, and emergency response will be provided through the 6G communication systems such that the technologies could be applied in various fields such as industry, medical care, automobiles, and home appliances.

An intelligent reflecting surface (IRS) is being envisioned as an energy efficient device for assisting 6th generation (6G) wireless communication systems in delivering a signal from a transmitter to a receiver. The IRS is also called as a reconfigurable intelligent surface (RIS). The IRS doesn't contain active components like radio frequency (RF) chains (e.g., amplifiers, mixers, filters, signal converters, or the like) that consume electric power. Hence, energy consumption of the IRS is very low. The IRS is a digitally-controlled meta surface with many low-cost passive reflectors, such as phase shifters and printed dipoles that reflect the signal transmitted from the transmitter towards the receiver for improving power of the signal receiving at the receiver at low cost. However, while reflecting the signal towards the receiver, the IRS indices an amplitude/phase shift to the signal, where the amplitude/phase shift can be controlled by an IRS controller. The IRS reflectors enable passive beamforming of the signal receives from the transmitter to improve the power of the signal receiving at the receiver. Similar to the IRS, transmit antenna selection (AS) is a traditional technology that improves energy and cost-efficiency by reducing lot of RF chains at the transmitter. According to the transmit AS, the transmitter selects a subset of antennas of the transmitter and connects them to available RF chains of the transmitter, which are smaller in number than antennas of the transmitter. The transmit AS achieves full diversity with fewer RF chains.

Several techniques are proposed to collaborate active beamforming (i.e., transmit beamforming) at the transmitter using the transmit AS and the passive beamforming at the IRS for improving the power of the signal receiving at the receiver. While performing active beamforming, the transmitter should monitor changes in a channel between the transmitter and the receiver due to presence of reflections of transmitted signal from the IRS. Further, the IRS with the passive beamforming needs to be configured with reflection coefficients to maximize the power of the signal receiving at the receiver.

In an existing method, a local optimal solution is developed in using an alternating optimization technique to minimize a transmit power at the transmitter. Different optimization techniques are currently existing to maximize the power of the signal receiving at the receiver. A fixed point iteration method is an existing method and a semi-definite relaxation (SDR) based technique that yields an approximate solution. Alternatively, a conjugate-gradient based manifold optimization technique, which converges to a local optimum solution that improves performance compared to the SDR based technique. Furthermore, a branch-and-bound method, that converges to a globally optimal solution, that has the performance of the manifold based method which is close to an optimal performance with lower computational complexity. All these existing methods include assuming a channel state information (CSI) at both the transmitter and the IRS, which is practically challenging to obtain due to passive nature of the IRS reflectors. Moreover, the existing methods are focused on beamforming at the transmitter, which needs multiple RF chains same as a number of antennas for transmission. Thus, it is desired to provide a best solution is needed for maximizing the power of the signal receiving at the receiver by incorporating the antenna subset selection and the passive beamforming.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device for enhancing power of a signal receiving at a receiver using an IRS. The method improves system performance with low hardware cost at the transmitter by assisting transmit antenna selection (AS) with passive beamforming at the IRS. The system performance is improved by performing optimal antenna subset selection, transmit beamforming at the transmitter and passive beamforming at the IRS to maximize the power of the signal received at the received.

Additional aspects will be set forth in part in the description which follows and, in part, will be apparent from the description, or may be learned by practice of the presented embodiments.

In accordance with an aspect of the disclosure, a method for enhancing power of a signal receiving at a receiver of a wireless communication system with an IRS is provided. The method includes estimating, by a transmitter of the wireless communication system, a channel gain by transmitting a pilot signal to the receiver through each antenna in a plurality of antennas of the transmitter and the IRS, determining, by the transmitter, an antenna selection metric based on the channel gain in transmitting the pilot signal to the receiver through each antenna in the plurality of antennas of the transmitter and the IRS, identifying, by the transmitter, an antenna from the plurality of antennas that causes to provide the largest antenna selection metric, determining, by the transmitter, a reflection coefficient for each reflector of the IRS based on the identified antenna, configuring, by the transmitter, the reflectors of the IRS with the reflection coefficient, and transmitting, by the transmitter, the signal to the receiver through the identified antenna and the configured reflectors.

In accordance with another aspect of the disclosure, a method for enhancing power of the signal receiving at a receiver of the wireless communication system with the IRS is provided. The method includes estimating, by the receiver, the channel gain by receiving the pilot signal from each antenna in the plurality of antennas of the transmitter and the IRS of the wireless communication system, determining, by the receiver, the antenna selection metric based on the channel gain in receiving the pilot signal from each antenna in the plurality of antennas of the transmitter and the IRS, identifying, by the receiver, the antenna from the plurality of antennas that causes to provide the largest antenna selection metric, determining, by the receiver, the reflection coefficient for each reflector of the IRS based on the identified antenna, and reporting, by the receiver, the identified antenna, and the reflection coefficient for each reflector to the transmitter for configuring the reflectors of the IRS with the reflection coefficient and enabling the transmitter to transmit the signal through the identified antenna.

In accordance with another aspect of the disclosure, a method for enhancing power of the signal receiving at a receiver of the wireless communication system with the IRS. The method includes estimating, by the transmitter of the wireless communication system, a first channel gain by transmitting the pilot signal to the receiver through each antenna in the plurality of antennas of the transmitter and the IRS, wherein the reflection coefficient for each reflector of the IRS is set as zero, estimating, by the transmitter, a second channel gain by transmitting the pilot signal to the receiver through each antenna of the plurality of antennas and the IRS, wherein the reflection coefficient for each reflector of the IRS is set as one, determining, by the transmitter, a difference between the second channel gain and the first channel gain for each antenna, identifying, by the transmitter, the antenna of the plurality of antennas that has a maximum of sum of a magnitude of the first channel gain and a magnitude of the difference between the second channel gain and the first channel gain, determining, by the transmitter, the reflection coefficient for each reflector of the IRS by sending each pilot signal in a set of pilot signals through the identified antenna and the IRS, wherein a number of the pilot signals in the set of pilot signals is equal to a number of the reflectors in the IRS, and transmitting, by the transmitter, the signal to the receiver through the identified antenna and the IRS based on the reflection coefficient.

In accordance with another aspect of the disclosure, a method for enhancing power of the signal receiving at a receiver of the wireless communication system with the IRS is provided. The method includes estimating, by the receiver, the first channel gain by receiving the pilot signal from each antenna in the plurality of antennas of the transmitter and the IRS of the wireless communication system, wherein the reflection coefficient for each reflector of the IRS is set as zero, estimating, by the receiver, the second channel gain by receiving the pilot signal from each antenna of the plurality of antennas and the IRS, wherein the reflection coefficient for each reflector of the IRS is set as one, determining, by the receiver, the difference between the second channel gain and the first channel gain for each antenna, identifying, by the receiver, the antenna of the plurality of antennas that has the maximum of sum of the magnitude of first channel gain and the magnitude of the difference between the second channel gain and the first channel gain, determining, by the receiver, the reflection coefficient for each reflector of the IRS by receiving each pilot signal in the set of pilot signals from the identified antenna and the IRS, wherein the number of the pilot signals in the set of pilot signals is equal to the number of the reflectors in the IRS, and reporting, by the receiver, the identified antenna and the reflection coefficient for each reflector to the transmitter for configuring the reflectors of the IRS with the reflection coefficient and enabling the transmitter to transmit the signal through the identified antenna.

In accordance with another aspect of the disclosure, a method for enhancing power of the signal receiving at a receiver of the wireless communication system with the IRS is provided. The method includes estimating, by the transmitter of the wireless communication system, the channel gain by transmitting the pilot signal to the receiver through a set of antennas in the plurality of antennas of the transmitter and the IRS, determining, by the transmitter, the antenna selection metric based on the channel gain in transmitting the pilot signal to the receiver through the set of antennas in the plurality of antennas of the transmitter and the IRS, identifying, by the transmitter, the set of antennas from the plurality of antennas that causes to provide the largest antenna selection metric, determining, by the transmitter, the reflection coefficient for each reflector of the IRS based on the set of antennas, configuring, by the transmitter, the reflectors of the IRS with the reflection coefficient, determining, by the transmitter, an optimal beamforming required for transmitting the signal from the set of antennas based on the reflection coefficient and the set of antennas, transmitting, by the transmitter, the signal to the receiver through the configured reflectors and the set of antennas based on the optimal beamforming, estimating, by the receiver, the channel gain by receiving the pilot signal from the set of antennas in the plurality of antennas of the transmitter and the IRS of the wireless communication system, determining, by the receiver, the antenna selection metric based on the channel gain in receiving the pilot signal from the set of antennas in the plurality of antennas of the transmitter and the IRS, identifying, by the receiver, the set of antennas from the plurality of antennas that causes to provide the largest antenna selection metric, determining, by the receiver, the reflection coefficient for each reflector of the IRS based on the identified set of antennas, and reporting, by the receiver, the identified set of antennas and the reflection coefficient for each reflector to the transmitter for configuring the reflectors of the IRS with the reflection coefficient and enabling the transmitter to transmit the signal through the identified set of antennas.

In accordance with another aspect of the disclosure, a method for enhancing power of the signal receiving at a receiver of the wireless communication system with the IRS is provided. The method includes estimating, by the transmitter of the wireless communication system, the first channel gain by transmitting the pilot signal to the receiver through each antenna in the plurality of antennas of the transmitter and the IRS, wherein the reflection coefficient for each reflector of the IRS is set as zero, estimating, by the transmitter, the second channel gain by transmitting the pilot signal to the receiver through each antenna of the plurality of antennas and the IRS, wherein the reflection coefficient for each reflector of the IRS is set as one, determining, by the transmitter, the difference between the second channel gain and the first channel gain for each antenna, sorting, by the transmitter, each antenna in decreasing order of the difference between the second channel gain and the first channel gain for each antenna, selecting, by the transmitter, top n number of antenna from the sorted antennas as the set of antennas, transmitting, by the transmitter, the pilot signal through the selected set of antennas, determining, by the transmitter, the reflection coefficient for each reflector of the IRS based on the set of antennas, configuring, by the transmitter, the reflectors of the IRS with the reflection coefficient, determining, by the transmitter, the optimal beamforming required for transmitting the signal from the set of antennas based on the reflection coefficient and the set of antennas, and transmitting, by the transmitter, the signal to the receiver through the configured reflectors and the set of antennas based on the optimal beamforming.

In accordance with another aspect of the disclosure, a method for enhancing power of the signal receiving at a receiver of the wireless communication system with the IRS is provided. The method includes estimating, by the receiver, the first channel gain by receiving the pilot signal from each antenna in the plurality of antennas of the transmitter and the IRS of the wireless communication system, wherein the reflection coefficient for each reflector of the IRS is set as zero, estimating, by the receiver, the second channel gain by receiving the pilot signal from each antenna of the plurality of antennas and the IRS, wherein the reflection coefficient for each reflector of the IRS is set as one, determining, by the receiver, the difference between the second channel gain and the first channel gain for each antenna, sorting, by the receiver, each antenna in decreasing order of the difference between the second channel gain and the first channel gain for each antenna, selecting, by the receiver, top n number of antenna from the sorted antennas as the set of antennas, determining, by the receiver, the reflection coefficient for each reflector of the IRS based on the set of antennas and the pilot signal transmitted by the transmitter, And reporting, by the receiver, the selected top n number of antenna and the reflection coefficient for each reflector to the transmitter for configuring the reflectors of the IRS with the reflection coefficient and enabling the transmitter to transmit the signal through the identified antenna.

In accordance with another aspect of the disclosure, a transmitter for enhancing power of the signal receiving at a receiver of the wireless communication system with the IRS is provided. The transmitter includes a memory, a communicator being equipped with a plurality of antennas and a plurality of radio frequency (RF) chains, and a processing circuitry, coupled with the memory and the communicator. The processing circuitry is configured to estimate the channel gain by transmitting the pilot signal to the receiver through each antenna in the plurality of antennas of the transmitter and the IRS, determine the antenna selection metric based on the channel gain in transmitting the pilot signal to the receiver through each antenna in the plurality of antennas of the transmitter and the IRS, identify the antenna from the plurality of antennas that causes to provide the largest antenna selection metric, determine the reflection coefficient for each reflector of the IRS based on the identified antenna, to configure the reflectors of the IRS with the reflection coefficient, and transmit the signal to the receiver through the identified antenna and the configured reflectors.

In accordance with another aspect of the disclosure, a receiver for enhancing power of the signal receiving from the transmitter and the IRS is provided. The receiver includes a memory, a communicator being equipped with at least one receive antennas and at least one receive radio frequency (RF) chain, and a processing circuitry, coupled with the memory and the communicator. The processing circuitry is configured to estimate the channel gain by receiving the pilot signal from each antenna in the plurality of antennas of the transmitter and the IRS, determine the antenna selection metric based on the channel gain in receiving the pilot signal from each antenna in the plurality of antennas of the transmitter and the IRS, identify the antenna from the plurality of antennas that causes to provide the largest antenna selection metric, determine the reflection coefficient for each reflector of the IRS based on the identified antenna, and report the identified antenna and the reflection coefficient for each reflector to the transmitter for configuring the reflectors of the IRS with the reflection coefficient and enabling the transmitter to transmit the signal through the identified antenna.

In accordance with another aspect of the disclosure, a transmitter for enhancing power of the signal receiving at a receiver of the wireless communication system with the IRS is provided. The transmitter includes a memory, a communicator being equipped with a plurality of antennas and a plurality of radio frequency (RF) chains, and a processing circuitry, coupled with the memory and the communicator. The processing circuitry is configured to estimate the first channel gain by transmitting the pilot signal to the receiver through each antenna in the plurality of antennas of the transmitter and the IRS, wherein the reflection coefficient for each reflector of the IRS is set as zero, estimate the second channel gain by transmitting the pilot signal to the receiver through each antenna of the plurality of antennas and the IRS, wherein the reflection coefficient for each reflector of the IRS is set as one, determine the difference between the second channel gain and the first channel gain for each antenna, identify the antenna of the plurality of antennas that has the maximum of sum of the magnitude of the first channel gain and the magnitude of the difference between the second channel gain and the first channel gain, determine the reflection coefficient for each reflector of the IRS by sending each pilot signal in the set of pilot signals through the identified antenna and the IRS, wherein the number of the pilot signals in the set of pilot signals is equal to the number of the reflectors in the IRS, and transmit the signal to the receiver through the identified antenna and the IRS based on the reflection coefficient.

In accordance with another aspect of the disclosure, a receiver for enhancing power of the signal receiving from the transmitter and the IRS is provided. The receiver includes a memory, a communicator being equipped with at least one receive antennas and at least one receive radio frequency (RF) chain, and a processing circuitry, coupled with the memory and the communicator. The processing circuitry is configured to estimate the first channel gain by receiving the pilot signal from each antenna in the plurality of antennas of the transmitter and the IRS, wherein the reflection coefficient for each reflector of the IRS is set as zero, estimate the second channel gain by receiving the pilot signal from each antenna of the plurality of antennas and the IRS, wherein the reflection coefficient for each reflector of the IRS is set as one, determine the difference between the second channel gain and the first channel gain for each antenna, identify the antenna of the plurality of antennas that has the maximum of sum of the magnitude of first channel gain and the magnitude of the difference between the second channel gain and the first channel gain, determine the reflection coefficient for each reflector of the IRS by receiving each pilot signal in the set of pilot signals from the identified antenna and the IRS, wherein the number of the pilot signals in the set of pilot signals is equal to the number of the reflectors in the IRS, and report the identified antenna and the reflection coefficient for each reflector to the transmitter for configuring the reflectors of the IRS with the reflection coefficient and enabling the transmitter to transmit the signal through the identified antenna.

In accordance with another aspect of the disclosure, a transmitter for enhancing power of the signal receiving at a receiver of the wireless communication system with the IRS is provided. The transmitter includes a memory, a communicator being equipped with a plurality of antennas and a plurality of radio frequency (RF) chains, and a processing circuitry, coupled with the memory and the communicator. The processing circuitry is configured to estimate the channel gain by transmitting the pilot signal to the receiver through the set of antennas in the plurality of antennas of the transmitter and the IRS, determine the antenna selection metric based on the channel gain in transmitting the pilot signal to the receiver through the set of antennas in the plurality of antennas of the transmitter and the IRS, identify the set of antennas from the plurality of antennas that causes to provide the largest antenna selection metric, determine the reflection coefficient for each reflector of the IRS based on the set of antennas, configure the reflectors of the IRS with the reflection coefficient, determine an optimal beamforming required for transmitting the signal from the set of antennas based on the reflection coefficient and the set of antennas, and transmit the signal to the receiver through the configured reflectors and the set of antennas based on the optimal beamforming.

In accordance with another aspect of the disclosure, a receiver for enhancing power of the signal receiving from the transmitter and the IRS is provided. The receiver includes a memory, a communicator being equipped with at least one receive antennas and at least one receive radio frequency (RF) chain, and a processing circuitry, coupled with the memory and the communicator. The processing circuitry is configured to estimate the channel gain by receiving the pilot signal from the set of antennas in the plurality of antennas of the transmitter and the IRS, determine the antenna selection metric based on the channel gain in receiving the pilot signal from the set of antennas in the plurality of antennas of the transmitter and the IRS, identify the set of antennas from the plurality of antennas that causes to provide the largest antenna selection metric, determine the reflection coefficient for each reflector of the IRS based on the identified set of antennas, and report the identified set of antennas and the reflection coefficient for each reflector to the transmitter for configuring the reflectors of the IRS with the reflection coefficient and enabling the transmitter to transmit the signal through the identified set of antennas.

In accordance with another aspect of the disclosure, a transmitter for enhancing power of the signal receiving at a receiver of the wireless communication system with the IRS is provided. The transmitter includes a memory, a communicator being equipped with a plurality of antennas and a plurality of radio frequency (RF) chains, and a processing circuitry, coupled with the memory and the communicator. The processing circuitry is configured to estimate the first channel gain by transmitting the pilot signal to the receiver through each antenna in the plurality of antennas of the transmitter and the IRS, wherein the reflection coefficient for each reflector of the IRS is set as zero, estimate the second channel gain by transmitting the pilot signal to the receiver through each antenna of the plurality of antennas and the IRS, wherein the reflection coefficient for each reflector of the IRS is set as one, determine the difference between the second channel gain and the first channel gain for each antenna, sort each antenna in decreasing order of the difference between the second channel gain and the first channel gain for each antenna, select top n number of antenna from the sorted antennas as the set of antennas, transmit the pilot signal through the selected set of antennas, determine the reflection coefficient for each reflector of the IRS based on the set of antennas, configure the reflectors of the IRS with the reflection coefficient, determine the optimal beamforming required for transmitting the signal from the set of antennas based on the reflection coefficient and the set of antennas, and transmit the signal to the receiver through the configured reflectors and the set of antennas based on the optimal beamforming.

In accordance with another aspect of the disclosure, a receiver for enhancing power of the signal receiving from the transmitter and the IRS is provided. The receiver includes a memory, a communicator being equipped with at least one receive antennas and at least one receive radio frequency (RF) chain, and a processing circuitry, coupled with the memory and the communicator. The processing circuitry is configured to estimate the first channel gain by receiving the pilot signal from each antenna in the plurality of antennas of the transmitter and the IRS, wherein the reflection coefficient for each reflector of the IRS is set as zero, estimate the second channel gain by receiving the pilot signal from each antenna of the plurality of antennas and the IRS, wherein the reflection coefficient for each reflector of the IRS is set as one, determine the difference between the second channel gain and the first channel gain for each antenna, sort each antenna in decreasing order of the difference between the second channel gain and the first channel gain for each antenna, select top n number of antenna from the sorted antennas as the set of antennas, determine the reflection coefficient for each reflector of the IRS based on the set of antennas and the pilot signal transmitted by the transmitter, and report the selected top n number of antenna and the reflection coefficient for each reflector to the transmitter for configuring the reflectors of the IRS with the reflection coefficient and enabling the transmitter to transmit the signal through the identified antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1:
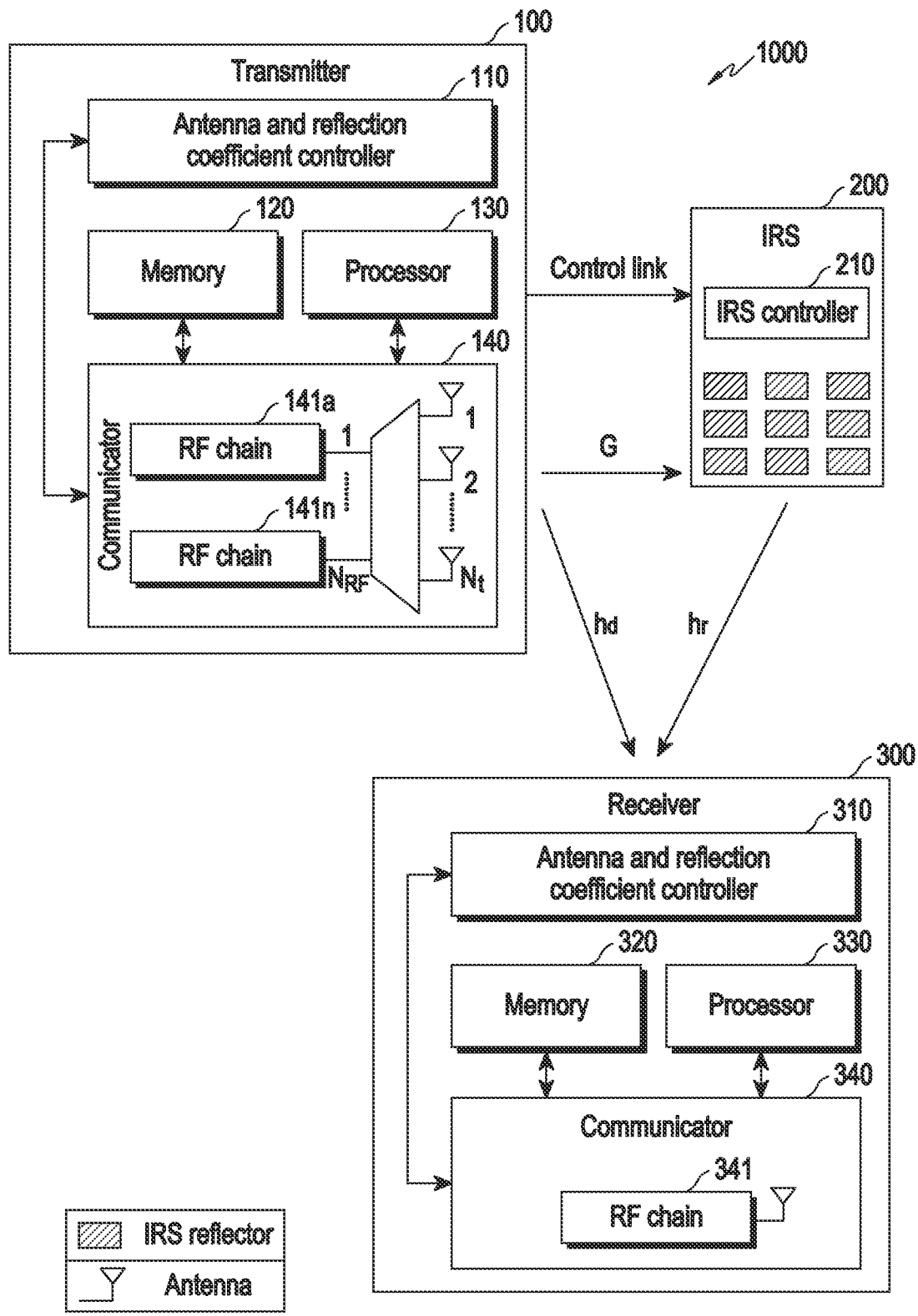
FIG. 1 is a block diagram of a wireless commination system for enhancing power of a signal receiving at a receiver with an intelligent reflecting surface (IRS) according to an embodiment of the disclosure.

The following description with reference to the accompanying drawings is provided to assist in a comprehensive understanding of various embodiments of the disclosure as defined by the claims and their equivalents. It includes various to specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Notations: Scalars are denoted by lower-case letters. Vectors and matrices are denoted by boldface lower-case and capital letters, respectively. $C^{m \times n}$ denotes the set of all complex valued matrices of size m×n and $j=\sqrt{-1}$ |a|, arg(a), and a* denote the absolute value, phase, and conjugate respectively of a complex number a. $\|x\|$, $x^\dagger$ and $[x]_n$ denote a 2-norm, conjugate transpose, and nth element of vector x.

Accordingly, the embodiments herein provide a method for enhancing power of a signal receiving at a receiver of a wireless communication system with an IRS. The method includes estimating, by a transmitter of the wireless communication system, a channel gain by transmitting a pilot signal to the receiver through each antenna in a plurality of antennas of the transmitter and the IRS. The method includes determining, by the transmitter, an antenna selection metric based on the channel gain in transmitting the pilot signal to the receiver through each antenna in the plurality of antennas of the transmitter and the IRS. The method includes identifying, by the transmitter, an antenna from the plurality of antennas that causes to provide the largest antenna selection metric. The method includes determining, by the transmitter, a reflection coefficient for each reflector of the IRS based on the identified antenna. The method includes configuring, by the transmitter, the reflectors of the IRS with the reflection coefficient. The method includes transmitting, by the transmitter, the signal to the receiver through the identified antenna and the configured reflectors.

Accordingly, the embodiments herein provide a method for enhancing power of the signal receiving at the receiver of the wireless communication system with the IRS. The method includes estimating, by the receiver, the channel gain by receiving the pilot signal from each antenna in the plurality of antennas of the transmitter and the IRS of the wireless communication system. The method includes determining, by the receiver, the antenna selection metric based on the channel gain in receiving the pilot signal from each antenna in the plurality of antennas of the transmitter and the IRS. The method includes identifying, by the receiver, the antenna from the plurality of antennas that causes to provide the largest antenna selection metric. The method includes determining, by the receiver, the reflection coefficient for each reflector of the IRS based on the identified antenna. The method includes reporting, by the receiver, the identified antenna and the reflection coefficient for each reflector to the transmitter for configuring the reflectors of the IRS with the reflection coefficient and enabling the transmitter to transmit the signal through the identified antenna.

Accordingly, the embodiments herein provide a method for enhancing power of the signal receiving at the receiver of the wireless communication system with the IRS. The method includes estimating, by the transmitter of the wireless communication system, a first channel gain by transmitting the pilot signal to the receiver through each antenna in the plurality of antennas of the transmitter and the IRS, wherein the reflection coefficient for each reflector of the IRS is set as zero. The method includes estimating, by the transmitter, a second channel gain by transmitting the pilot signal to the receiver through each antenna of the plurality of antennas and the IRS, wherein the reflection coefficient for each reflector of the IRS is set as one. The method includes determining, by the transmitter, a difference between the second channel gain and the first channel gain for each antenna. The method includes identifying, by the transmitter, the antenna of the plurality of antennas that has a maximum of sum of a magnitude of the first channel gain and a magnitude of the difference between the second channel gain and the first channel gain. The method includes determining, by the transmitter, the reflection coefficient for each reflector of the IRS by sending each pilot signal in a set of pilot signals through the identified antenna and the IRS, wherein a number of the pilot signals in the set of pilot signals is equal to a number of the reflectors in the IRS. The method includes transmitting, by the transmitter, the signal to the receiver through the identified antenna and the IRS based on the reflection coefficient.

Accordingly, the embodiments herein provide the method for enhancing power of the signal receiving at the receiver of the wireless communication system with the IRS. The method includes estimating, by the receiver, the first channel gain by receiving the pilot signal from each antenna in the plurality of antennas of the transmitter and the IRS of the wireless communication system, wherein the reflection coefficient for each reflector of the IRS is set as zero. The method includes estimating, by the receiver, the second channel gain by receiving the pilot signal from each antenna of the plurality of antennas and the IRS, wherein the reflection coefficient for each reflector of the IRS is set as one. The method includes determining, by the receiver, the difference between the second channel gain and the first channel gain for each antenna. The method includes identifying, by the receiver, the antenna of the plurality of antennas that has the maximum of sum of the magnitude of first channel gain and the magnitude of the difference between the second channel gain and the first channel gain. The method includes determining, by the receiver, the reflection coefficient for each reflector of the IRS by receiving each pilot signal in the set of pilot signals from the identified antenna and the IRS, wherein the number of the pilot signals in the set of pilot signals is equal to the number of the reflectors in the IRS. The method includes reporting, by the receiver, the identified antenna and the reflection coefficient for each reflector to the transmitter for configuring the reflectors of the IRS with the reflection coefficient and enabling the transmitter to transmit the signal through the identified antenna.

Accordingly, the embodiments herein provide a method for enhancing power of the signal receiving at the receiver of the wireless communication system with the IRS. The method includes estimating, by the transmitter of the wireless communication system, the channel gain by transmitting the pilot signal to the receiver through a set of antennas in the plurality of antennas of the transmitter and the IRS. The method includes determining, by the transmitter, the antenna selection metric based on the channel gain in transmitting the pilot signal to the receiver through the set of antennas in the plurality of antennas of the transmitter and the IRS. The method includes identifying, by the transmitter, the set of antennas from the plurality of antennas that causes to provide the largest antenna selection metric. The method includes determining, by the transmitter, the reflection coefficient for each reflector of the IRS based on the set of antennas. The method includes configuring, by the transmitter, the reflectors of the IRS with the reflection coefficient. The method includes determining, by the transmitter, an optimal beamforming required for transmitting the signal from the set of antennas based on the reflection coefficient and the set of antennas. The method includes transmitting, by the transmitter, the signal to the receiver through the configured reflectors and the set of antennas based on the optimal beamforming. The method includes estimating, by the receiver, the channel gain by receiving the pilot signal from the set of antennas in the plurality of antennas of the transmitter and the IRS of the wireless communication system. The method includes determining, by the receiver, the antenna selection metric based on the channel gain in receiving the pilot signal from the set of antennas in the plurality of antennas of the transmitter and the IRS. The method includes identifying, by the receiver, the set of antennas from the plurality of antennas that causes to provide the largest antenna selection metric. The method includes determining, by the receiver, the reflection coefficient for each reflector of the IRS based on the identified set of antennas. The method includes reporting, by the receiver, the identified set of antennas and the reflection coefficient for each reflector to the transmitter for configuring the reflectors of the IRS with the reflection coefficient and enabling the transmitter to transmit the signal through the identified set of antennas.

Accordingly, the embodiments herein provide a method for enhancing power of the signal receiving at the receiver of the wireless communication system with the IRS. The method includes estimating, by the transmitter of the wireless communication system, the first channel gain by transmitting the pilot signal to the receiver through each antenna in the plurality of antennas of the transmitter and the IRS, wherein the reflection coefficient for each reflector of the IRS is set as zero. The method includes estimating, by the transmitter, the second channel gain by transmitting the pilot signal to the receiver through each antenna of the plurality of antennas and the IRS, wherein the reflection coefficient for each reflector of the IRS is set as one. The method includes determining, by the transmitter, the difference between the second channel gain and the first channel gain for each antenna. The method includes sorting, by the transmitter, each antenna in decreasing order of the difference between the second channel gain and the first channel gain for each antenna. The method includes selecting, by the transmitter, top n number of antenna from the sorted antennas as the set of antennas. The method includes transmitting, by the transmitter, the pilot signal through the selected set of antennas. The method includes determining, by the transmitter, the reflection coefficient for each reflector of the IRS based on the set of antennas. The method includes configuring, by the transmitter, the reflectors of the IRS with the reflection coefficient. The method includes determining, by the transmitter, the optimal beamforming required for transmitting the signal from the set of antennas based on the reflection coefficient and the set of antennas. The method includes transmitting, by the transmitter, the signal to the receiver through the configured reflectors and the set of antennas based on the optimal beamforming.

Accordingly, the embodiments herein provide a method for enhancing power of the signal receiving at the receiver of the wireless communication system with the IRS. The method includes estimating, by the receiver, the first channel gain by receiving the pilot signal from each antenna in the plurality of antennas of the transmitter and the IRS of the wireless communication system, wherein the reflection coefficient for each reflector of the IRS is set as zero. The method includes estimating, by the receiver, the second channel gain by receiving the pilot signal from each antenna of the plurality of antennas and the IRS, wherein the reflection coefficient for each reflector of the IRS is set as one. The method includes determining, by the receiver, the difference between the second channel gain and the first channel gain for each antenna. The method includes sorting, by the receiver, each antenna in decreasing order of the difference between the second channel gain and the first channel gain for each antenna. The method includes selecting, by the receiver, top n number of antenna from the sorted antennas as the set of antennas. The method includes determining, by the receiver, the reflection coefficient for each reflector of the IRS based on the set of antennas and the pilot signal transmitted by the transmitter. The method includes reporting, by the receiver, the selected top n number of antenna and the reflection coefficient for each reflector to the transmitter for configuring the reflectors of the IRS with the reflection coefficient and enabling the transmitter to transmit the signal through the identified antenna.

Accordingly, the embodiments herein provide the transmitter for enhancing power of the signal receiving at the receiver of the wireless communication system with the IRS. The transmitter includes a memory, a communicator being equipped with a plurality of antennas and a plurality of radio frequency (RF) chains, and a processing circuitry, coupled with the memory and the communicator. The processing circuitry is configured for estimating the channel gain by transmitting the pilot signal to the receiver through each antenna in the plurality of antennas of the transmitter and the IRS. The processing circuitry is configured for determining the antenna selection metric based on the channel gain in transmitting the pilot signal to the receiver through each antenna in the plurality of antennas of the transmitter and the IRS. The processing circuitry is configured for identifying the antenna from the plurality of antennas that causes to provide the largest antenna selection metric. The processing circuitry is configured for determining the reflection coefficient for each reflector of the IRS based on the identified antenna. The processing circuitry is configured for configuring the reflectors of the IRS with the reflection coefficient. The processing circuitry is configured for transmitting the signal to the receiver through the identified antenna and the configured reflectors.

Accordingly, the embodiments herein provide the receiver for enhancing power of the signal receiving from the transmitter and the IRS. The receiver includes a memory, a communicator being equipped with at least one receive antennas and at least one receive radio frequency (RF) chain, and a processing circuitry, coupled with the memory and the communicator. The processing circuitry is configured for estimating the channel gain by receiving the pilot signal from each antenna in the plurality of antennas of the transmitter and the IRS. The processing circuitry is configured for determining the antenna selection metric based on the channel gain in receiving the pilot signal from each antenna in the plurality of antennas of the transmitter and the IRS. The processing circuitry is configured for identifying the antenna from the plurality of antennas that causes to provide the largest antenna selection metric. The processing circuitry is configured for determining the reflection coefficient for each reflector of the IRS based on the identified antenna. The processing circuitry is configured for reporting the identified antenna and the reflection coefficient for each reflector to the transmitter for configuring the reflectors of the IRS with the reflection coefficient and enabling the transmitter to transmit the signal through the identified antenna.

Accordingly, the embodiments herein provide the transmitter for enhancing power of the signal receiving at the receiver of the wireless communication system with the IRS. The transmitter includes a memory, a communicator being equipped with a plurality of antennas and a plurality of radio frequency (RF) chains, and a processing circuitry, coupled with the memory and the communicator. The processing circuitry is configured for estimating the first channel gain by transmitting the pilot signal to the receiver through each antenna in the plurality of antennas of the transmitter and the IRS, wherein the reflection coefficient for each reflector of the IRS is set as zero. The processing circuitry is configured for estimating the second channel gain by transmitting the pilot signal to the receiver through each antenna of the plurality of antennas and the IRS, wherein the reflection coefficient for each reflector of the IRS is set as one. The processing circuitry is configured for determining the difference between the second channel gain and the first channel gain for each antenna. The processing circuitry is configured for identifying the antenna of the plurality of antennas that has the maximum of sum of the magnitude of the first channel gain and the magnitude of the difference between the second channel gain and the first channel gain. The processing circuitry is configured for determining the reflection coefficient for each reflector of the IRS by sending each pilot signal in the set of pilot signals through the identified antenna and the IRS, wherein the number of the pilot signals in the set of pilot signals is equal to the number of the reflectors in the IRS. The processing circuitry is configured for transmitting the signal to the receiver through the identified antenna and the IRS based on the reflection coefficient.

Accordingly, the embodiments herein provide the receiver for enhancing power of the signal receiving from the transmitter and the IRS. The receiver includes a memory, a communicator being equipped with at least one receive antennas and at least one receive radio frequency (RF) chain, and a processing circuitry, coupled with the memory and the communicator. The processing circuitry is configured for estimating the first channel gain by receiving the pilot signal from each antenna in the plurality of antennas of the transmitter and the IRS, wherein the reflection coefficient for each reflector of the IRS is set as zero. The processing circuitry is configured for estimating the second channel gain by receiving the pilot signal from each antenna of the plurality of antennas and the IRS, wherein the reflection coefficient for each reflector of the IRS is set as one. The processing circuitry is configured for determining the difference between the second channel gain and the first channel gain for each antenna. The processing circuitry is configured for identifying the antenna of the plurality of antennas that has the maximum of sum of the magnitude of first channel gain and the magnitude of the difference between the second channel gain and the first channel gain. The processing circuitry is configured for determining the reflection coefficient for each reflector of the IRS by receiving each pilot signal in the set of pilot signals from the identified antenna and the IRS, wherein the number of the pilot signals in the set of pilot signals is equal to the number of the reflectors in the IRS. The processing circuitry is configured for reporting the identified antenna and the reflection coefficient for each reflector to the transmitter for configuring the reflectors of the IRS with the reflection coefficient and enabling the transmitter to transmit the signal through the identified antenna.

Accordingly, the embodiments herein provide the transmitter for enhancing power of the signal receiving at the receiver of the wireless communication system with the IRS. The transmitter includes a memory, a communicator being equipped with a plurality of antennas and a plurality of radio frequency (RF) chains, and a processing circuitry, coupled with the memory and the communicator. The processing circuitry is configured for estimating the channel gain by transmitting the pilot signal to the receiver through the set of antennas in the plurality of antennas of the transmitter and the IRS. The processing circuitry is configured for determining the antenna selection metric based on the channel gain in transmitting the pilot signal to the receiver through the set of antennas in the plurality of antennas of the transmitter and the IRS. The processing circuitry is configured for identifying the set of antennas from the plurality of antennas that causes to provide the largest antenna selection metric. The processing circuitry is configured for determining the reflection coefficient for each reflector of the IRS based on the set of antennas. The processing circuitry is configured for configuring the reflectors of the IRS with the reflection coefficient. The processing circuitry is configured for determining an optimal beamforming required for transmitting the signal from the set of antennas based on the reflection coefficient and the set of antennas. The processing circuitry is configured for transmitting the signal to the receiver through the configured reflectors and the set of antennas based on the optimal beamforming.

Accordingly, the embodiments herein provide the receiver for enhancing power of the signal receiving from the transmitter and the IRS. The receiver includes a memory, a communicator being equipped with at least one receive antennas and at least one receive radio frequency (RF) chain, and a processing circuitry, coupled with the memory and the communicator. The processing circuitry is configured for estimating the channel gain by receiving the pilot signal from the set of antennas in the plurality of antennas of the transmitter and the IRS. The processing circuitry is configured for determining the antenna selection metric based on the channel gain in receiving the pilot signal from the set of antennas in the plurality of antennas of the transmitter and the IRS. The processing circuitry is configured for identifying the set of antennas from the plurality of antennas that causes to provide the largest antenna selection metric. The processing circuitry is configured for determining the reflection coefficient for each reflector of the IRS based on the identified set of antennas. The processing circuitry is configured for reporting the identified set of antennas and the reflection coefficient for each reflector to the transmitter for configuring the reflectors of the IRS with the reflection coefficient and enabling the transmitter to transmit the signal through the identified set of antennas.

Accordingly, the embodiments herein provide the transmitter for enhancing power of the signal receiving at the receiver of the wireless communication system with the IRS. The transmitter includes a memory, a communicator being equipped with a plurality of antennas and a plurality of radio frequency (RF) chains, and a processing circuitry, coupled with the memory and the communicator. The processing circuitry is configured for estimating the first channel gain by transmitting the pilot signal to the receiver through each antenna in the plurality of antennas of the transmitter and the IRS, wherein the reflection coefficient for each reflector of the IRS is set as zero. The processing circuitry is configured for estimating the second channel gain by transmitting the pilot signal to the receiver through each antenna of the plurality of antennas and the IRS, wherein the reflection coefficient for each reflector of the IRS is set as one. The processing circuitry is configured for determining the difference between the second channel gain and the first channel gain for each antenna. The processing circuitry is configured for sorting each antenna in decreasing order of the difference between the second channel gain and the first channel gain for each antenna. The processing circuitry is configured for selecting top n number of antenna from the sorted antennas as the set of antennas. The processing circuitry is configured for transmitting the pilot signal through the selected set of antennas. The processing circuitry is configured for determining the reflection coefficient for each reflector of the IRS based on the set of antennas. The processing circuitry is configured for configuring the reflectors of the IRS with the reflection coefficient. The processing circuitry is configured for determining the optimal beamforming required for transmitting the signal from the set of antennas based on the reflection coefficient and the set of antennas. The processing circuitry is configured for transmitting the signal to the receiver through the configured reflectors and the set of antennas based on the optimal beamforming.

Accordingly, the embodiments herein provide the receiver for enhancing power of the signal receiving from the transmitter and the IRS. The receiver includes a memory, a communicator being equipped with at least one receive antennas and at least one receive radio frequency (RF) chain, and a processing circuitry, coupled with the memory and the communicator. The processing circuitry is configured for estimating the first channel gain by receiving the pilot signal from each antenna in the plurality of antennas of the transmitter and the IRS, wherein the reflection coefficient for each reflector of the IRS is set as zero. The processing circuitry is configured for estimating the second channel gain by receiving the pilot signal from each antenna of the plurality of antennas and the IRS, wherein the reflection coefficient for each reflector of the IRS is set as one. The processing circuitry is configured for determining the difference between the second channel gain and the first channel gain for each antenna. The processing circuitry is configured for sorting each antenna in decreasing order of the difference between the second channel gain and the first channel gain for each antenna. The processing circuitry is configured for selecting top n number of antenna from the sorted antennas as the set of antennas. The processing circuitry is configured for determining the reflection coefficient for each reflector of the IRS based on the set of antennas and the pilot signal transmitted by the transmitter. The processing circuitry is configured for reporting the selected top n number of antenna and the reflection coefficient for each reflector to the transmitter for configuring the reflectors of the IRS with the reflection coefficient and enabling the transmitter to transmit the signal through the identified antenna.

Existing systems choose the antenna or the set of antenna for signal transmission by assuming that a Channel State Information (CSI) is available at both the transmitter and the IRS. The IRS is a passive component and hence the CSI at the IRS is not practically possible to calculate. Unlike existing methods and systems, the proposed transmitter/receiver selects the antenna or the set of antenna for signal transmission by assuming that the CSI is available only at the transmitter. Therefore, the antenna selection will be accurate due to not considering the CSI at the IRS for the antenna selection.

Unlike existing methods and systems, the proposed method determines the channel gains for the antenna selection with less number of pilot signals. Therefore, computations required for the antenna selection are very less for the proposed method with respect to the existing methods and systems.

The proposed method is used to select a subset of antennas to be used for transmission using the RF chains, which is determined to maximize power of the signal receiving at the receiver. The proposed antenna selection method helps the transmitter to achieve performance gain equivalent to a performance gain giving by an existing transmitter with same number of RF chains and antennas, saving significantly in cost. Unlike the existing transmitter, the proposed transmitter contains less number of RF chains than the number of antennas, which significantly reduces a design complexity, size, and manufacturing cost of the transmitter.

Referring now to the drawings, and more particularly to FIGS. 1, 2A, 2B, 2C, 2D, 3A, 3B, 3C, 3B, 4, 5, 6, 7, and 8, there are shown preferred embodiments.

FIG. 1 is a block diagram of a wireless commination system for enhancing power of a signal receiving at a receiver with an IRS according to an embodiment of the disclosure.

Referring to FIG. 1, a wireless commination system (1000) includes a transmitter (100), an IRS (200), and a receiver (300). In an embodiment of the disclosure, the transmitter (100) includes an Antenna and Reflection Coefficient Controller (ARCC) (110), a memory (120), a processor (130), and a communicator (140). In an embodiment of the disclosure, the communicator (140) is equipped with $N_t$ antennas and $N_{RF}$ number of RF chains (1141a-1141n), where $N_{RF} \le N_t$, and 'RF' and 't' are natural numbers. In an embodiment of the disclosure, the receiver (300) includes an ARCC (310), a memory (320), a processor (330), and a communicator (340). In an embodiment of the disclosure, the communicator (340) is equipped with a single antenna and an RF chain (341). The transmitter (100) communicates to the receiver (300) through a direct link (ha) between the antennas of the transmitter (100) and the antenna of the receiver (300), and through a reflection link (G+h$_r$) formed between the antennas of the transmitter (100) and the receiver (300) due to the IRS (200). The IRS (200) is equipped with N number of passive reflectors (also called as IRS reflectors) and an IRS controller (210), where N is a natural number. The IRS controller (210) tunes each IRS reflector based on an input received from the transmitter (100) and/or the receiver (300). Hence, any change in IRS properties will affect a channel as well. The IRS controller (210) is configured with reflection coefficients from the transmitter (100) to control a magnitude of reflection loss (β) and a phase shift (θ) of the IRS reflectors. The transmitter (100) dynamically selects $N_{RF}$ antennas from the set of antennas $\{1, 2, \ldots, N_t\}$, connects them to the RF chains (1141a-1141n) available, and performs transmit beamforming.

In an embodiment of the disclosure, if a base station (BS) operates as the transmitter (100) then a user equipment (UE) operates as the receiver (300), whereas if the UE operates as the transmitter (100) then the BS operates as the receiver (300). Examples of the BS are, but are not limited to an eNodeB, a gNodeB, or the like. Examples of the UE are, but are not limited to a smartphone, a wearable device, an Internet of things (IoT) device, a laptop, or the like.

The memory (120) stores instructions to be executed by the processor (130). The memory (320) stores instructions to be executed by the processor (330). The memory (120, 320) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120, 320) may, in some examples, be considered a non-transitory storage medium. The term "non-transitory" may indicate that the storage medium is not embodied in a carrier wave or a propagated signal. However, the term "non-transitory" should not be interpreted that the memory (120, 320) is non-movable. In some examples, the memory (120, 320) can be configured to store larger amounts of information than its storage space. In certain examples, a non-transitory storage medium may store data that can, over time, change (e.g., in a random access memory (RAM) or cache). The memory (120, 320) can be an internal storage unit or it can be an external storage unit of the transmitter (100), a cloud storage, or any other type of external storage. The memory (320) can be an internal storage unit or it can be an external storage unit of the receiver (300), a cloud storage, or any other type of external storage.

The processor (130) is configured to execute instructions stored in the memory (120). The processor (330) is configured to execute instructions stored in the memory (320). The processor (130, 330) may be a general-purpose processor, such as a central processing unit (CPU), an application processor (AP), or the like, a graphics-only processing unit, such as a graphics processing unit (GPU), a visual processing unit (VPU) and the like. The processor (130, 330) may include multiple cores to execute the instructions. The communicator (140) is configured for communicating internally between hardware components in the transmitter (100). Further, the communicator (140) is configured to facilitate the communication between the transmitter (100) and other devices via one or more networks (e.g., Radio technology). The communicator (340) is configured for communicating internally between hardware components in the receiver (300). Further, the communicator (340) is configured to facilitate the communication between the receiver (300) and other devices via one or more networks (e.g., radio technology). The communicator (140, 340) includes an electronic circuit specific to a standard that enables wired or wireless communication.

The ARCC (110, 310) is implemented by processing circuitry, such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports, such as printed circuit boards, and the like.

In an embodiment of the disclosure, the ARCC (110) estimates a channel gain by transmitting a pilot signal to the receiver (300) through each antenna in a plurality of antennas of the transmitter (100) and the IRS (200). In an embodiment of the disclosure, in order to estimate the channel gain, the ARCC (110) transmits the pilot signal to the receiver (300) through each antenna in the plurality of antennas of the transmitter (100) by disabling the IRS (200). The ARCC (310) determines a location of the pilot signal based on a time and frequency of the pilot signal, in response to receiving the pilot signal by the receiver (300). Further, the ARCC (310) estimates the channel gain based on the pilot signal when the IRS (200) is disabled. Further, the ARCC (110) transmits the pilot signal to the receiver (300) through each antenna in the plurality of antennas of the transmitter (100) by enabling the IRS (200) and setting the reflection coefficient to one. The ARCC (310) estimates the channel gain based on the pilot signal when the IRS (200) is enabled, in response to receiving the pilot signal by the receiver (300). Further, the ARCC (310) reports the channel gain estimated while the IRS (200) is disabled and enabled to the transmitter (100).

The ARCC (110) determines an antenna selection metric based on the channel gain in transmitting the pilot signal to the receiver (300) through each antenna in the plurality of antennas of the transmitter (100) and the IRS (200). Further, the ARCC (110) identifies an antenna from the plurality of antennas that causes to provide the largest antenna selection metric. Further, the ARCC (110) determines a reflection coefficient for each reflector of the IRS (200) based on the identified antenna. In an embodiment of the disclosure, the reflection coefficient includes a phase shift (0) and a magnitude of reflection loss (13). Further, the ARCC (110) configures the reflectors of the IRS (200) with the reflection coefficient. Further, the ARCC (110) transmits the signal to the receiver (300) through the identified antenna and the configured reflectors.

In another embodiment of the disclosure, the ARCC (310) estimates the channel gain by receiving the pilot signal from each antenna in the plurality of antennas of the transmitter (100) and the IRS (200). Further, the ARCC (310) determines the antenna selection metric based on the channel gain in receiving the pilot signal from each antenna in the plurality of antennas of the transmitter (100) and the IRS (200). Further, the ARCC (310) identifies the antenna from the plurality of antennas that causes to provide the largest antenna selection metric. Further, the ARCC (310) determines the reflection coefficient for each reflector of the IRS (200) based on the identified antenna. Further, the ARCC (310) reports the identified antenna and the reflection coefficient for each reflector to the transmitter (100). The ARCC (110) configures the reflectors of the IRS (200) with the reflection coefficient and enabling the transmitter (100) to transmit the signal through the identified antenna, in response to receiving the report of the identified antenna and the reflection coefficient for each reflector from the receiver.

In another embodiment of the disclosure, the ARCC (110) estimates a first channel gain by transmitting the pilot signal to the receiver (300) through each antenna in the plurality of antennas of the transmitter (100) and the IRS (200), where the reflection coefficient for each reflector of the IRS (200) is set as zero. In an embodiment of the disclosure, in order to estimate the first channel gain, the ARCC (110) transmits the pilot signal to the receiver (300) through each antenna in the plurality of antennas of the transmitter (100) by disabling the IRS (200). The ARCC (310) determines the location of the pilot signal based on the time and the frequency of the pilot signal, in response to receiving the pilot signal. Further, the ARCC (310) estimates the first channel gain based on the pilot signal. Further, the ARCC (310) reports the first channel gain to the transmitter (100).

The ARCC (110) estimates a second channel gain by transmitting the pilot signal to the receiver (300) through each antenna of the plurality of antennas and the IRS (200), where the reflection coefficient for each reflector of the IRS (200) is set as one. In an embodiment of the disclosure, in order to estimate the second channel gain, the ARCC (110) transmits the pilot signal to the receiver (300) through each antenna in the plurality of antennas of the transmitter (100) by enabling the IRS (200) and setting the reflection coefficient to one. The ARCC (310) determines the location of the pilot signal based on the time and the frequency of the pilot signal, in response to receiving the pilot signal. Further, the ARCC (310) estimates the second channel gain based on the pilot signal. Further, the ARCC (310) reports the second channel gain to the transmitter (100).

The ARCC (110) determines a difference between the second channel gain and the first channel gain for each antenna. Further, the ARCC (110) identifies the antenna of the plurality of antennas that has a maximum of sum of a magnitude of the first channel gain and a magnitude of the difference between the second channel gain and the first channel gain. Further, the ARCC (110) determines the reflection coefficient for each reflector of the IRS (200) by sending each pilot signal in a set of pilot signals through the identified antenna and the IRS (200), where a number of the pilot signals in the set of pilot signals is equal to a number of the reflectors in the IRS (200). Further, the ARCC (110) transmits the signal to the receiver (300) through the identified antenna and the IRS (200) based on the reflection coefficient.

In another embodiment of the disclosure, the ARCC (310) estimates the first channel gain by receiving the pilot signal from each antenna in the plurality of antennas of the transmitter (100) and the IRS (200), where the reflection coefficient for each reflector of the IRS (200) is set as zero. Further, the ARCC (310) estimates the second channel gain by receiving the pilot signal from each antenna of the plurality of antennas and the IRS (200), where the reflection coefficient for each reflector of the IRS (200) is set as one. Further, the ARCC (310) determines the difference between the second channel gain and the first channel gain for each antenna. Further, the ARCC (310) identifies the antenna of the plurality of antennas that has the maximum of sum of the magnitude of first channel gain and the magnitude of the difference between the second channel gain and the first channel gain. Further, the ARCC (310) determines the reflection coefficient for each reflector of the IRS (200) by receiving each pilot signal in the set of pilot signals from the identified antenna and the IRS (200), where the number of the pilot signals in the set of pilot signals is equal to the number of the reflectors in the IRS (200). Further, the ARCC (310) reports the identified antenna and the reflection coefficient for each reflector to the transmitter (100).

In another embodiment of the disclosure, the ARCC (110) estimates the channel gain by transmitting the pilot signal to the receiver (300) through the set of antennas in the plurality of antennas of the transmitter (100) and the IRS (200). In an embodiment of the disclosure, the ARCC (110) transmits the pilot signal to the receiver (300) through the set of antennas in the plurality of antennas of the transmitter (100) by disabling the IRS (200). The ARCC (310) determines the location of the pilot signal based on the time and the frequency of the pilot signal, in response to receiving the pilot signal. Further, the ARCC (310) estimates the channel gain based on the pilot signal when the IRS (200) is disabled. The ARCC (110) transmits the pilot signal to the receiver (300) through the set of antennas in the plurality of antennas of the transmitter (100) by enabling the IRS (200) and setting the reflection coefficient to one. Further, the ARCC (310) estimates the channel gain based on the pilot signal when the IRS (200) is enabled, in response to receiving the pilot signal. Further, the ARCC (310) reports the channel gain estimated while the IRS (200) is disabled and enabled to the transmitter (100).

The ARCC (110) determines the antenna selection metric based on the channel gain in transmitting the pilot signal to the receiver (300) through the set of antennas in the plurality of antennas of the transmitter (100) and the IRS (200). Further, the ARCC (110) identifies the set of antennas from the plurality of antennas that causes to provide the largest antenna selection metric. Further, the ARCC (110) determines the reflection coefficient for each reflector of the IRS (200) based on the set of antennas. Further, the ARCC (110) configures the reflectors of the IRS (200) with the reflection coefficient. Further, the ARCC (110) determines an optimal beamforming required for transmitting the signal from the set of antennas based on the reflection coefficient and the set of antennas. Further, the ARCC (110) transmits the signal to the receiver (300) through the configured reflectors and the set of antennas based on the optimal beamforming.

In another embodiment of the disclosure, the ARCC (310) estimates the channel gain by receiving the pilot signal from the set of antennas in the plurality of antennas of the transmitter (100) and the IRS (200). In an embodiment of the disclosure, in order to estimate the channel gain, the ARCC (310) receives the pilot signal from the set of antennas in the plurality of antennas of the transmitter (100) by disabling the IRS (200). Further, the ARCC (310) determines the location of the pilot signal based on the time and the frequency of the pilot signal. Further, the ARCC (310) estimates the channel gain based on the pilot signal when the IRS (200) is disabled. Further, the ARCC (310) receives the pilot signal from the set of antennas in the plurality of antennas of the transmitter (100) by enabling the IRS (200) and setting the reflection coefficient to one. Further, the ARCC (310) estimates the channel gain based on the pilot signal when the IRS (200) is enabled.

The ARCC (310) determines the antenna selection metric based on the channel gain in receiving the pilot signal from the set of antennas in the plurality of antennas of the transmitter (100) and the IRS (200). Further, the ARCC (310) identifies the set of antennas from the plurality of antennas that causes to provide the largest antenna selection metric. Further, the ARCC (310) determines the reflection coefficient for each reflector of the IRS (200) based on the identified set of antennas. Further, the ARCC (310) reports the identified set of antennas and the reflection coefficient for each reflector to the transmitter (100). The ARCC (110) configures the reflectors of the IRS (200) with the reflection coefficient and enabling the transmitter (100) to transmit the signal through the identified set of antennas, in response to receiving the report from the receiver (300).

In another embodiment of the disclosure, the ARCC (110) estimates the first channel gain by transmitting the pilot signal to the receiver (300) through each antenna in the plurality of antennas of the transmitter (100) and the IRS (200), where the reflection coefficient for each reflector of the IRS (200) is set as zero. Further, the ARCC (110) estimates the second channel gain by transmitting the pilot signal to the receiver (300) through each antenna of the plurality of antennas and the IRS (200), where the reflection coefficient for each reflector of the IRS (200) is set as one. Further, the ARCC (110) determines the difference between the second channel gain and the first channel gain for each antenna. Further, the ARCC (110) sorts each antenna in decreasing order of the difference between the second channel gain and the first channel gain for each antenna. Further, the ARCC (110) selects the top n number of antenna from the sorted antennas as the set of antennas. Further, the ARCC (110) transmits the pilot signal through the selected set of antennas. Further, the ARCC (110) determines the reflection coefficient for each reflector of the IRS (200) based on the set of antennas. Further, the ARCC (110) configures the reflectors of the IRS (200) with the reflection coefficient. Further, the ARCC (110) determines optimal beamforming required for transmitting the signal from the set of antennas based on the reflection coefficient and the set of antennas. Further, the ARCC (110) transmits the signal to the receiver (300) through the configured reflectors and the set of antennas based on the optimal beamforming.

In another embodiment of the disclosure, the ARCC (310) estimates the first channel gain by receiving the pilot signal from each antenna in the plurality of antennas of the transmitter (100) and the IRS (200), where the reflection coefficient for each reflector of the IRS (200) is set as zero. Further, the ARCC (310) estimates the second channel gain by receiving the pilot signal from each antenna of the plurality of antennas and the IRS (200), where the reflection coefficient for each reflector of the IRS (200) is set as one. Further, the ARCC (310) determines the difference between the second channel gain and the first channel gain for each antenna. Further, the ARCC (310) sorts each antenna in decreasing order of the difference between the second channel gain and the first channel gain for each antenna. Further, the ARCC (310) selects top n number of antenna from the sorted antennas as the set of antennas. Further, the ARCC (310) determines the reflection coefficient for each reflector of the IRS (200) based on the set of antennas and the pilot signal transmitted by the transmitter (100). Further, the ARCC (310) reports the selected top n number of antenna and the reflection coefficient for each reflector to the transmitter (100).

In another embodiment of the disclosure, both the transmitter (100), and the receiver (300) comprising a Machine Learning (ML) engine for determining the channel gain and the reflection coefficient for each reflector of the IRS (200). In an embodiment of the disclosure, the ARCC (110, 310) monitors the channel gain estimated for the at least one antenna at various instant of time. Further, the ARCC (110, 310) trains the ML engine to learn the estimated channel gain. Further, the ARCC (110, 310) predicts the channel gain in transmitting the pilot signal to the receiver (300) through the at least one antenna based on the learning using the ML engine. In an embodiment of the disclosure, the ARCC (110, 310) monitors the reflection coefficient determined at various instant of time. Further, the ARCC (110, 310) trains the ML engine to learn the determined reflection coefficient. Further, the ARCC (110, 310) predicts predicting the reflection coefficient for each reflector of the IRS (200) based on the learning using the ML engine.

At least one of the plurality of modules may be implemented through the ML engine. A function associated with the ML engine may be performed through the non-volatile memory, the volatile memory, and the processor (130, 330).

The one or a plurality of processors control the processing of the input data in accordance with a predefined operating rule or ML engine stored in the non-volatile memory and the volatile memory. The predefined operating rule or artificial intelligence model is provided through training or learning.

Here, being provided through learning means that, by applying a learning technique to a plurality of learning data, a predefined operating rule or ML engine of a desired characteristic is made. The learning may be performed in a device itself in which the ML engine according to an embodiment is performed, and/o may be implemented through a separate server/system.

The ML engine may consist of a plurality of neural network layers. Each layer has a plurality of weight values, and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Although the FIG. 1 shows the hardware components of the electronic device (100) but it is to be understood that other embodiments are not limited thereon. In other embodiments of the disclosure, the electronic device (100) may include less or more number of components. Further, the labels or names of the components are used only for illustrative purpose and does not limit the scope of the disclosure. One or more components can be combined together to perform same or substantially similar function for enhancing power of the signal receiving at the receiver (300).

Figure 2A:
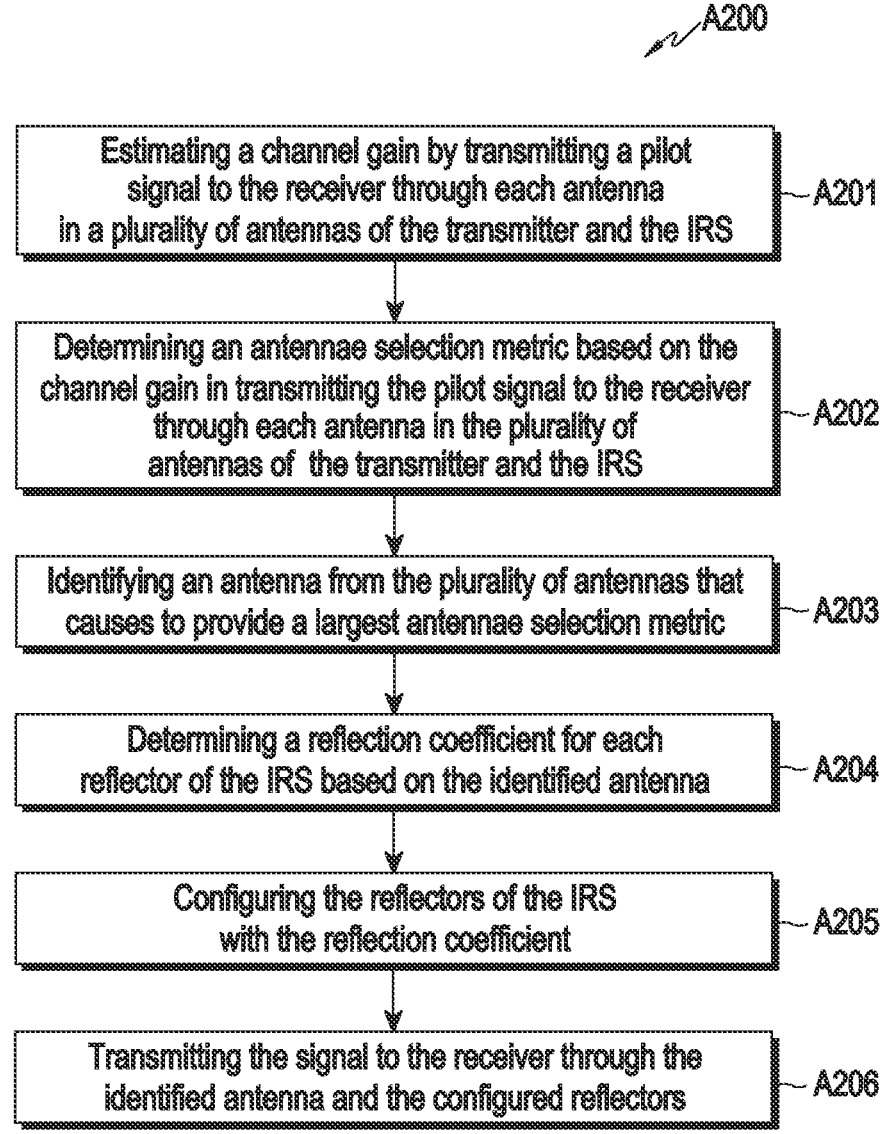
FIG. 2A is a flow diagram illustrating a method for enhancing power of a signal receiving at a receiver with an IRS according to an embodiment of the disclosure.

FIG. 2A is a flow diagram (A200) illustrating a method for enhancing power of a signal receiving at the receiver with the IRS according to an embodiment of the disclosure.

Referring to FIG. 2A, the method allows the ARCC (110) to perform operations A201-A206 of the flow diagram (A200). At operation A201, the method includes estimating the channel gain by transmitting the pilot signal to the receiver (300) through each antenna in the plurality of antennas of the transmitter (100) and the IRS (200). At operation A202, the method includes determining the antenna selection metric based on the channel gain in transmitting the pilot signal to the receiver (300) through each antenna in the plurality of antennas of the transmitter (100) and the IRS (200).

At operation A203, the method includes identifying the antenna from the plurality of antennas that causes to provide the largest antenna selection metric. At operation A204, the method includes determining the reflection coefficient for each reflector of the IRS (200) based on the identified antenna. At operation A205, the method includes configuring the reflectors of the IRS (200) with the reflection coefficient. At operation A206, the method includes transmitting the signal to the receiver (300) through the identified antenna and the configured reflectors.

Figure 2B:
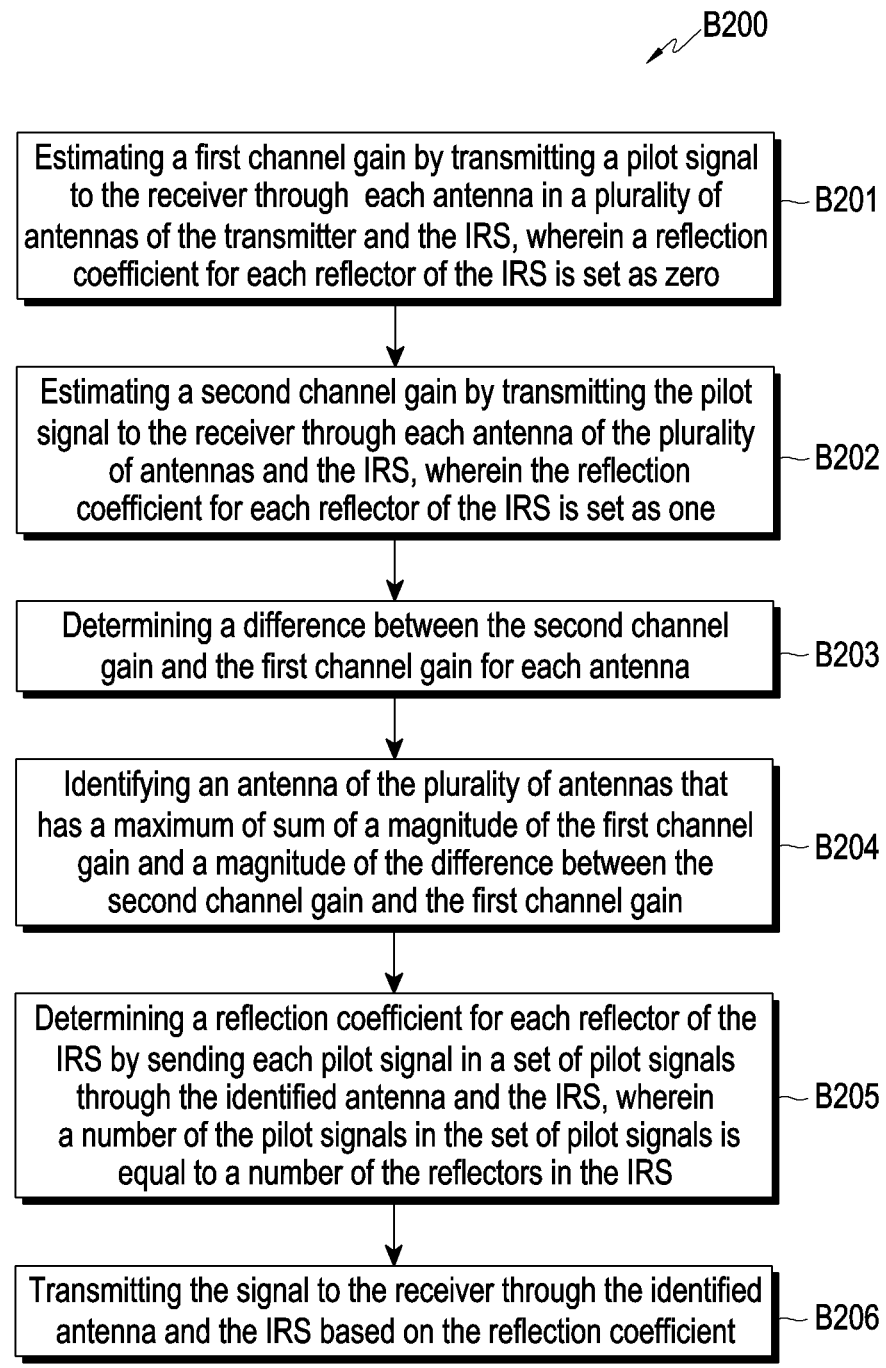
FIG. 2B is a flow diagram illustrating a method for enhancing power of a signal receiving at a receiver with an IRS according to an embodiment of the disclosure.

FIG. 2B is a flow diagram (B200) illustrating a method for enhancing power of a signal receiving at a receiver with an IRS according to an embodiment of the disclosure.

Referring to FIG. 2B, the method allows the ARCC (110) to perform operations B201-B206 of the flow diagram (B200). At operation B201, the method includes estimating the first channel gain by transmitting the pilot signal to the receiver (300) through each antenna in the plurality of antennas of the transmitter (100) and the IRS (200), wherein the reflection coefficient for each reflector of the IRS (200) is set as zero. At operation B202, the method includes estimating the second channel gain by transmitting the pilot signal to the receiver (300) through each antenna of the plurality of antennas and the IRS (200), wherein the reflection coefficient for each reflector of the IRS (200) is set as one.

At operation B203, the method includes determining the difference between the second channel gain and the first channel gain for each antenna. At operation B204, the method includes identifying the antenna of the plurality of antennas that has the maximum of sum of the magnitude of the first channel gain and the magnitude of the difference between the second channel gain and the first channel gain. At operation B205, the method includes determining the reflection coefficient for each reflector of the IRS (200) by sending each pilot signal in the set of pilot signals through the identified antenna and the IRS (200), wherein the number of the pilot signals in the set of pilot signals is equal to the number of the reflectors in the IRS (200). At operation B206, the method includes transmitting the signal to the receiver (300) through the identified antenna and the IRS (200) based on the reflection coefficient.

Figure 2C:
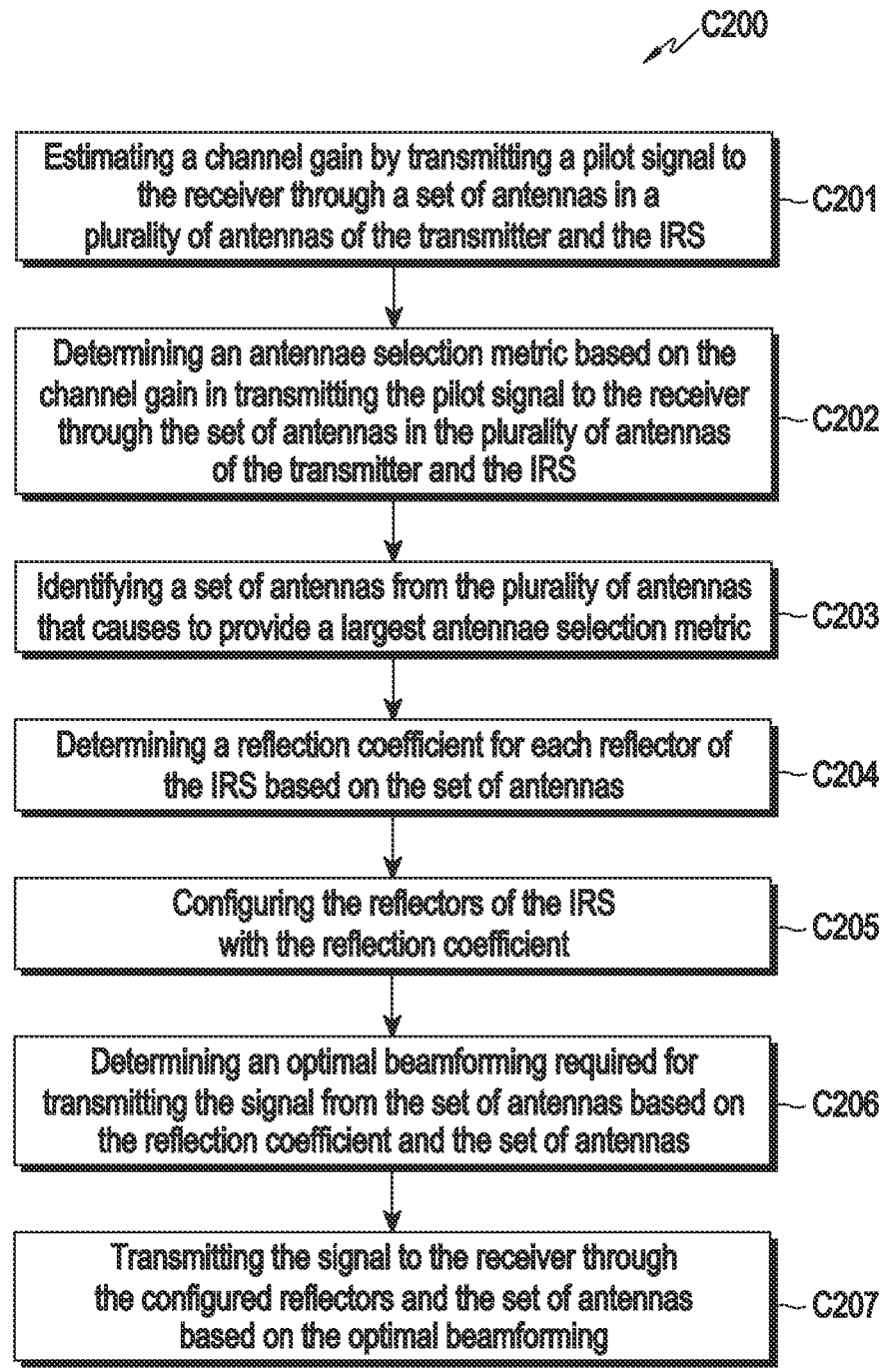
FIG. 2C is a flow diagram illustrating a method for enhancing power of a signal receiving at a receiver with an IRS according to an embodiment of the disclosure.

FIG. 2C is a flow diagram (C200) illustrating a method for enhancing power of a signal receiving at a receiver with an IRS according to an embodiment of the disclosure.

Referring to FIG. 2C, the method allows the ARCC (110) to perform operations C201-C207 of the flow diagram (C200). At operation C201, the method includes estimating the channel gain by transmitting the pilot signal to the receiver (300) through the set of antennas in the plurality of antennas of the transmitter (100) and the IRS (200). At operation C202, the method includes determining the antenna selection metric based on the channel gain in transmitting the pilot signal to the receiver (300) through the set of antennas in the plurality of antennas of the transmitter (100) and the IRS (200).

At operation C203, the method includes identifying the set of antennas from the plurality of antennas that causes to provide the largest antenna selection metric. At operation C204, the method includes determining the reflection coefficient for each reflector of the IRS (200) based on the set of antennas. At operation C205, the method includes configuring the reflectors of the IRS (200) with the reflection coefficient. At operation C206, the method includes determining the optimal beamforming required for transmitting the signal from the set of antennas based on the reflection coefficient and the set of antennas. At operation C207, the method includes transmitting the signal to the receiver (300) through the configured reflectors and the set of antennas based on the optimal beamforming.

Figure 2D:
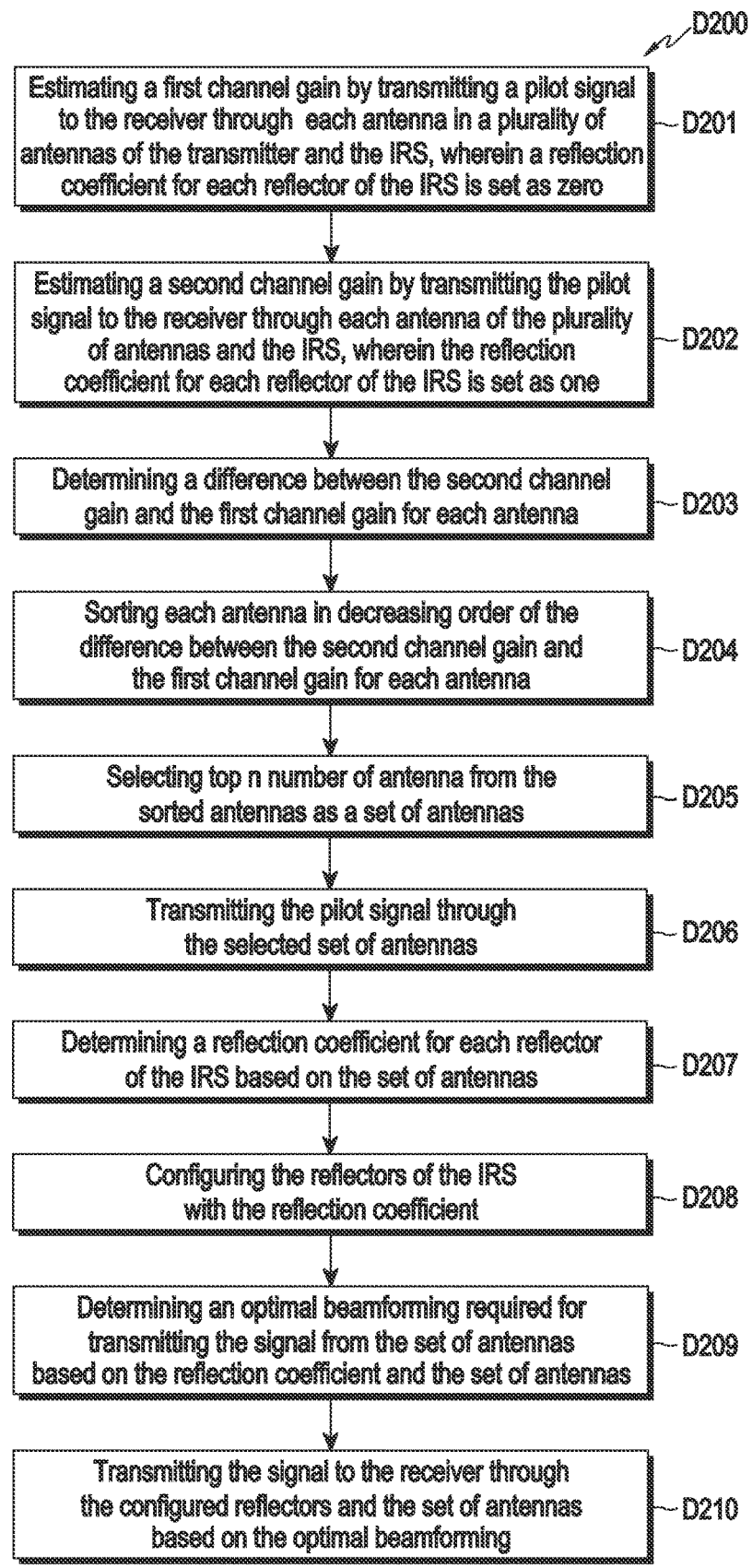
FIG. 2D is a flow diagram illustrating a method for enhancing power of a signal receiving at a receiver with an IRS according to an embodiment of the disclosure.

FIG. 2D is a flow diagram (D200) illustrating a method for enhancing power of a signal receiving at a receiver with an IRS according to an embodiment of the disclosure.

Referring to FIG. 2D, the method allows the ARCC (110) to perform operations D201-D210 of the flow diagram (D200). At operation D201, the method includes estimating the first channel gain by transmitting the pilot signal to the receiver (300) through each antenna in the plurality of antennas of the transmitter (100) and the IRS (200), wherein the reflection coefficient for each reflector of the IRS (200) is set as zero. At operation D202, the method includes estimating the second channel gain by transmitting the pilot signal to the receiver (300) through each antenna of the plurality of antennas and the IRS (200), wherein the reflection coefficient for each reflector of the IRS (200) is set as one. At operation D203, the method includes determining the difference between the second channel gain and the first channel gain for each antenna. At operation D204, the method includes sorting each antenna in decreasing order of the difference between the second channel gain and the first channel gain for each antenna.

At operation D205, the method includes selecting top n number of antenna from the sorted antennas as the set of antennas. At operation D206, the method includes transmitting the pilot signal through the selected set of antennas. At operation D207, the method includes determining the reflection coefficient for each reflector of the IRS (200) based on the set of antennas. At operation D208, the method includes configuring the reflectors of the IRS (200) with the reflection coefficient. At operation D209, the method includes determining the optimal beamforming required for transmitting the signal from the set of antennas based on the reflection coefficient and the set of antennas. At operation D210, the method includes transmitting the signal to the receiver (300) through the configured reflectors and the set of antennas based on the optimal beamforming.

Figure 3A:
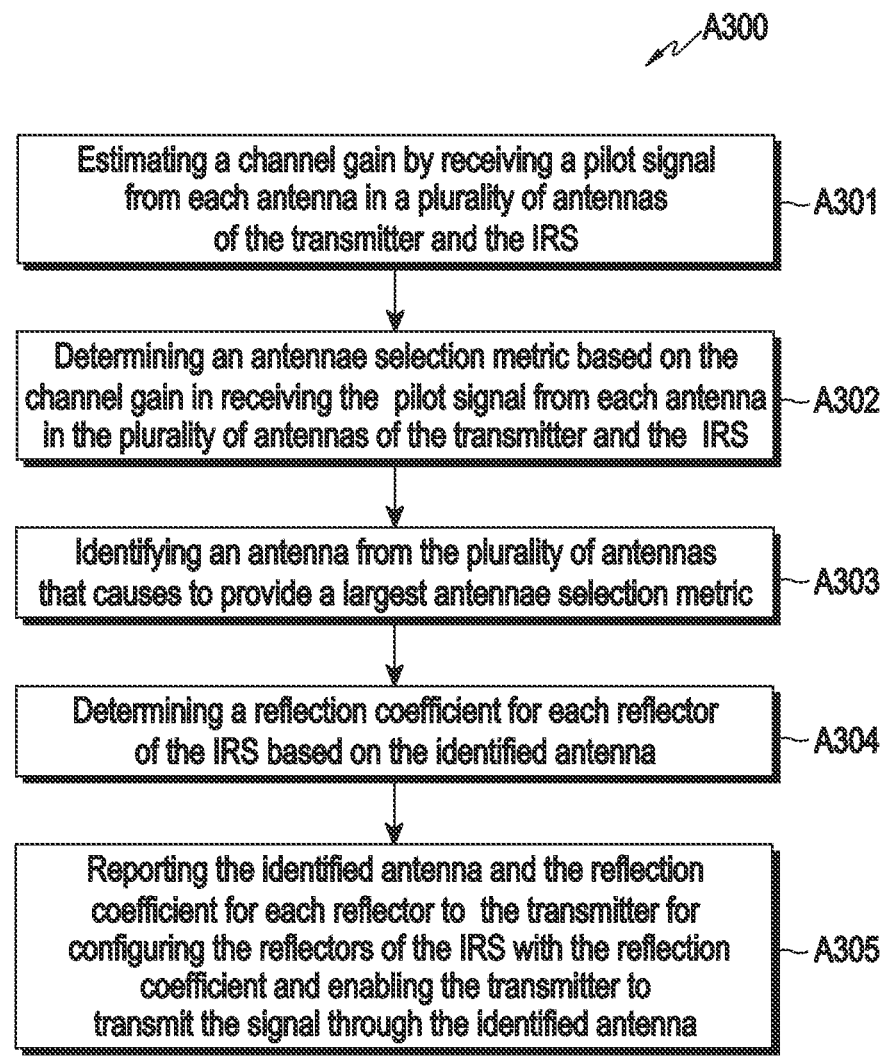
FIG. 3A is a flow diagram illustrating a method for enhancing power of a signal receiving at a receiver with an IRS according to an embodiment of the disclosure.

FIG. 3A is a flow diagram (A300) illustrating a method for enhancing power of a signal receiving at a receiver with an IRS according to an embodiment of the disclosure.

Referring to FIG. 3A, the method allows the ARCC (310) to perform operations A301-A305 of the flow diagram (A300). At operation A301, the method includes estimating the channel gain by receiving the pilot signal from each antenna in the plurality of antennas of the transmitter (100) and the IRS (200). At operation A302, the method includes determining the antenna selection metric based on the channel gain in receiving the pilot signal from each antenna in the plurality of antennas of the transmitter (100) and the IRS (200). At operation A303, the method includes identifying the antenna from the plurality of antennas that causes to provide the largest antenna selection metric. At operation A304, the method includes determining the reflection coefficient for each reflector of the IRS (200) based on the identified antenna. At operation A305, the method includes reporting the identified antenna and the reflection coefficient for each reflector to the transmitter (100) for configuring the reflectors of the IRS (200) with the reflection coefficient and enabling the transmitter (100) to transmit the signal through the identified antenna.

Figure 3B:
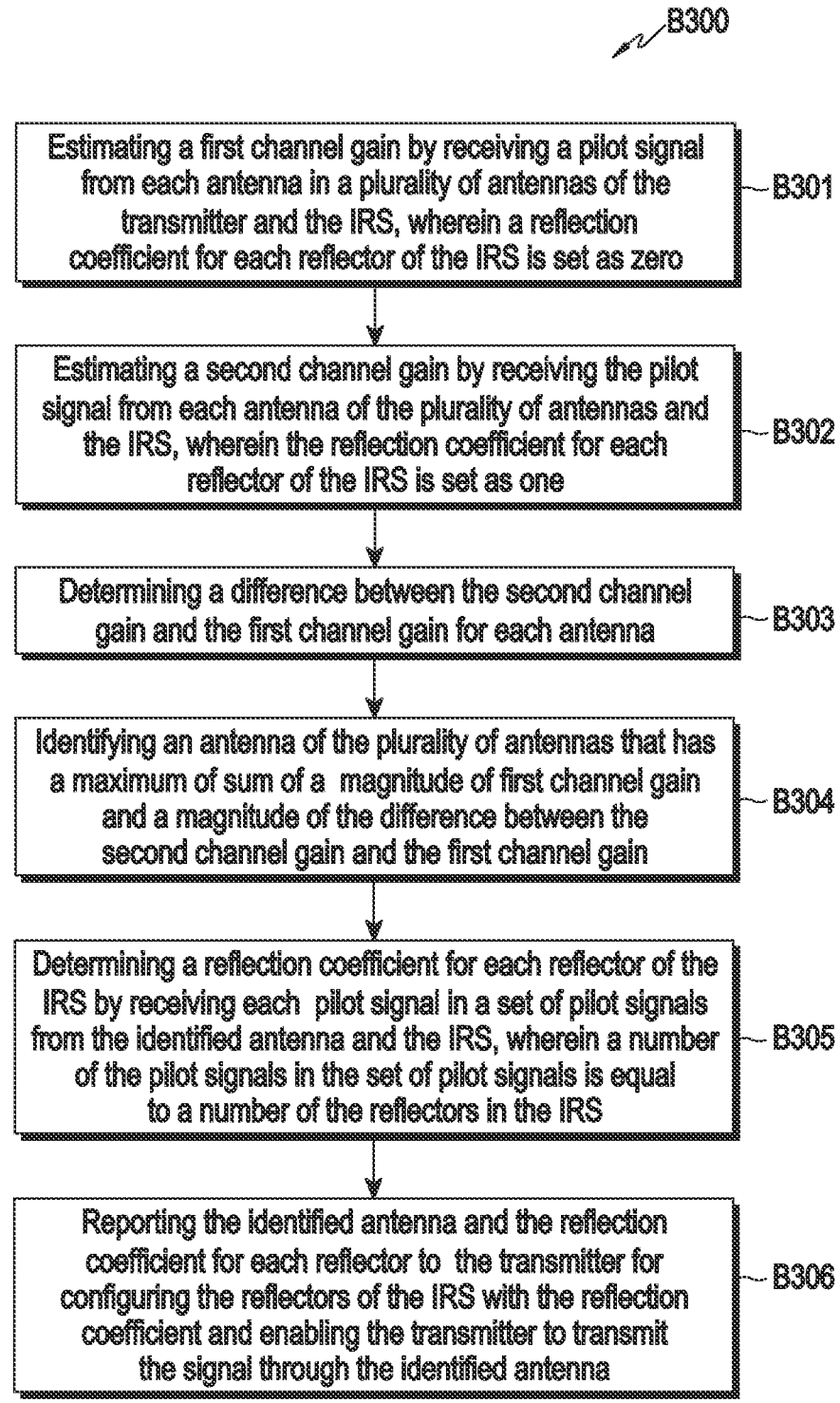
FIG. 3B is a flow diagram illustrating a method for enhancing power of a signal receiving at a receiver with an IRS according to an embodiment of the disclosure.

FIG. 3B is a flow diagram (B300) illustrating a method for enhancing power of a signal receiving at a receiver (300) with an IRS according to an embodiment of the disclosure.

Referring to FIG. 3B, the method allows the ARCC (310) to perform operations B301-B306 of the flow diagram (B300). At operation B301, the method includes estimating the first channel gain by receiving the pilot signal from each antenna in the plurality of antennas of the transmitter (100) and the IRS (200), wherein the reflection coefficient for each reflector of the IRS (200) is set as zero. At operation B302, the method includes estimating the second channel gain by receiving the pilot signal from each antenna of the plurality of antennas and the IRS (200), wherein the reflection coefficient for each reflector of the IRS (200) is set as one.

At operation B303, the method includes determining the difference between the second channel gain and the first channel gain for each antenna. At operation B304, the method includes identifying the antenna of the plurality of antennas that has the maximum of sum of the magnitude of first channel gain and the magnitude of the difference between the second channel gain and the first channel gain. At operation B305, the method includes determining the reflection coefficient for each reflector of the IRS (200) by receiving each pilot signal in the set of pilot signals from the identified antenna and the IRS (200), wherein the number of the pilot signals in the set of pilot signals is equal to the number of the reflectors in the IRS (200). At operation B306, the method includes reporting the identified antenna and the reflection coefficient for each reflector to the transmitter (100) for configuring the reflectors of the IRS (200) with the reflection coefficient and enabling the transmitter (100) to transmit the signal through the identified antenna.

Figure 3C:
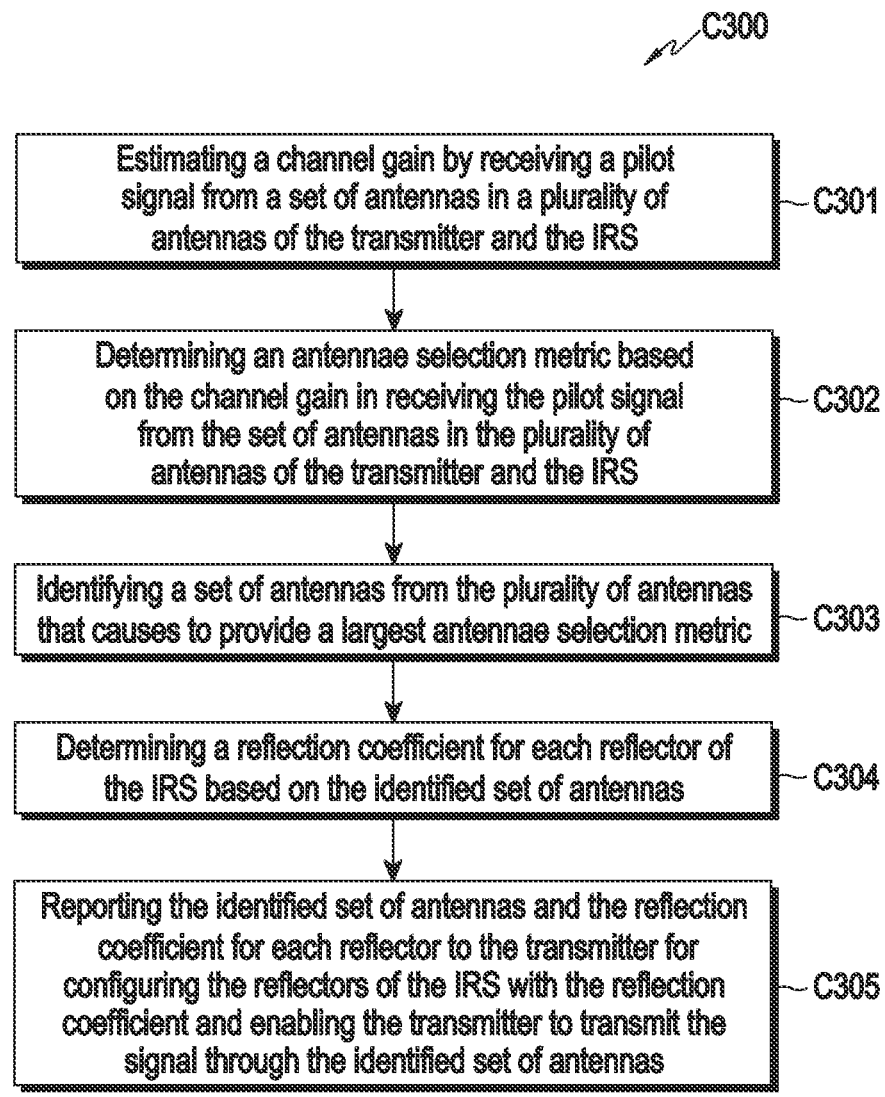
FIG. 3C is a flow diagram illustrating a method for enhancing power of a signal receiving at a receiver with an IRS according to an embodiment of the disclosure.

FIG. 3C is a flow diagram (C300) illustrating a method for enhancing power of a signal receiving at a receiver with an IRS according to an embodiment of the disclosure.

Referring to FIG. 3C, the method allows the ARCC (310) to perform operations C301-C305 of the flow diagram (C300). At operation C301, the method includes estimating the channel gain by receiving the pilot signal from the set of antennas in the plurality of antennas of the transmitter (100) and the IRS (200). At operation C302, the method includes determining the antenna selection metric based on the channel gain in receiving the pilot signal from the set of antennas in the plurality of antennas of the transmitter (100) and the IRS (200).

At operation C303, the method includes identifying the set of antennas from the plurality of antennas that causes to provide the largest antenna selection metric. At operation C304, the method includes determining the reflection coefficient for each reflector of the IRS (200) based on the identified set of antennas. At operation C305, the method includes reporting the identified set of antennas and the reflection coefficient for each reflector to the transmitter (100) for configuring the reflectors of the IRS (200) with the reflection coefficient and enabling the transmitter (100) to transmit the signal through the identified set of antennas.

Figure 3D:
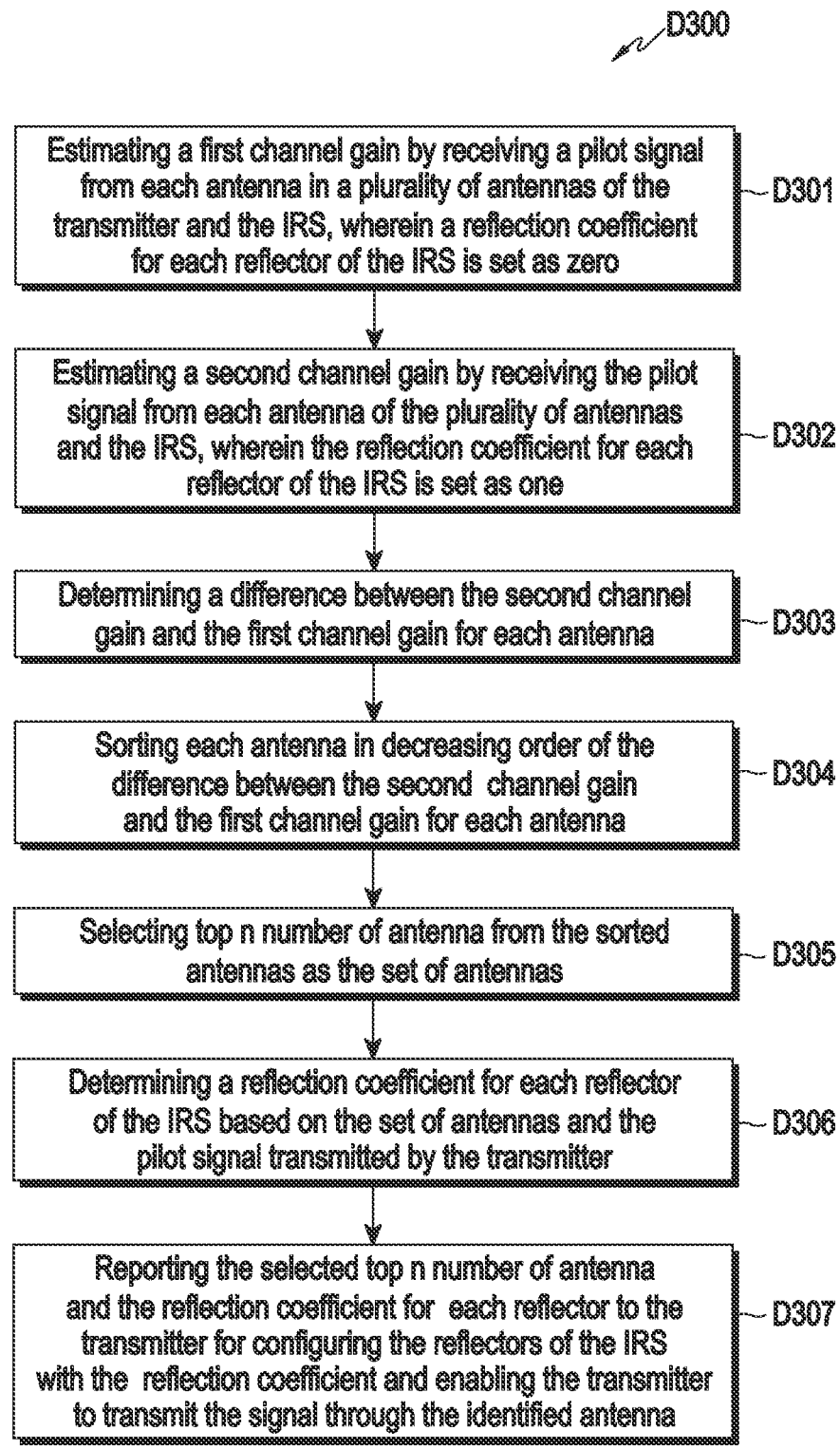
FIG. 3D is a flow diagram illustrating a method for enhancing power of a signal receiving at a receiver with an IRS according to an embodiment of the disclosure.

FIG. 3D is a flow diagram (D300) illustrating a method for enhancing power of a signal receiving at a receiver with an IRS according to an embodiment of the disclosure.

Referring to FIG. 3D, the method allows the ARCC (310) to perform operations D301-D307 of the flow diagram (D300). At operation D301, the method includes estimating the first channel gain by receiving the pilot signal from each antenna in the plurality of antennas of the transmitter (100) and the IRS (200), wherein the reflection coefficient for each reflector of the IRS (200) is set as zero. At operation D302, the method includes estimating the second channel gain by receiving the pilot signal from each antenna of the plurality of antennas and the IRS (200), wherein the reflection coefficient for each reflector of the IRS (200) is set as one. At operation D303, the method includes determining the difference between the second channel gain and the first channel gain for each antenna.

At operation D304, the method includes sorting each antenna in decreasing order of the difference between the second channel gain and the first channel gain for each antenna. At operation D305, the method includes selecting top n number of antenna from the sorted antennas as the set of antennas. At operation D306, the method includes determining the reflection coefficient for each reflector of the IRS (200) based on the set of antennas and the pilot signal transmitted by the transmitter (100). At operation D307, the method includes reporting the selected top n number of antenna and the reflection coefficient for each reflector to the transmitter (100) for configuring the reflectors of the IRS (200) with the reflection coefficient and enabling the transmitter (100) to transmit the signal through the identified antenna.

The various actions, acts, blocks, steps, or the like in the flow diagrams (A200, B200, C200, D200, A300, B300, C300, D300) may be performed in the order presented, in a different order or simultaneously. Further, in some embodiments of the disclosure, some of the actions, acts, blocks, steps, or the like may be omitted, added, modified, skipped, or the like without departing from the scope of the disclosure.

With reference to the FIG. 1, a model of channel is considered in an example scenario for describing the proposed method is a quasi-static flat-fading channel model. Furthermore, an operation mode considered in this example scenario is a Time-Division Duplexing (TDD) mode of operation to exploit reciprocity and reduce a CSI feedback overhead. Let $h_r^\dagger=[h_{r,n}^*]\in\mathbb{C}^{1\times N}$ denotes a complex baseband channel gain vector from the IRS (200) to the receiver (300). Let $h_d^\dagger=[h_{d,k}^*]\in\mathbb{C}^{1\times N_t}$ and $G=[g_{n,k}]\in\mathbb{C}^{N\times N_t}$ denote the complex baseband channel gain vector from the transmitter (100) to the receiver (300) and complex channel gain matrix from the transmitter (100) to the IRS (200) respectively. Let S denotes a set of all possible subsets of set $\{1, 2, \ldots, N_t\}$ each containing $N_{RF}$ elements. Let $S\in\mathcal{S}$ denotes a subset containing indices of $N_{RF}$ antennas selected. Let $h_{d,S}^\dagger \in \mathbb{C}^{1\times NRF}$ denotes the channel gain vector from the transmitter (100) to the receiver (300) corresponding to the subset S and $G_S\in\mathbb{C}^{N\times NRF}$ denotes sub-matrix that contains columns of G corresponding to antenna indices in S. The reflection coefficient of $n^{th}$ IRS reflector is denoted by $x_n=\beta e^{j\theta_n}$, where $\theta_n\in[0,2\pi]$ and $\beta\in[0,1]$ are a phase shift and a reflection loss of the $n^{th}$ IRS reflector. Let $x=[x_1, \ldots, x_N]^\dagger$ be a passive beamforming vector at the IRS (200) and $w=[w_k]\in\mathbb{C}^{NRF\times 1}$ denotes the transmit beamforming vector at the transmitter (100).

The transmitter transmits data symbol d using the subset of antennas S. Then the receiver receives a signal $h_{d,S}^\dagger w d$ through the direct link from the transmitter to the receiver. The signal transmitted from an antenna k and reflected through the $n^{th}$ IRS reflector, which applies the reflection coefficient $x_n$, observes a cascaded channel $h_{r,n}^* x_n g_{nk}$. Hence, the receiver receives $h_{r,n}^* x_n g_{nk} w_k d$ through the reflected link (i.e., link from transmitter to IRS to receiver). The composite signal received through all the selected antennas and all IRS reflectors is given by $\sum_{n=1}^{N} h_{r,n}^* x_n$

[G$_S$w]$_n$d, which can be written as x$^\dagger$ diag(h$_r^\dagger$)G$_S$wd, where diag(h$_r^\dagger$) denotes a diagonal matrix with elements of h$_r^\dagger$ as its diagonal elements. Therefore, the signal y received at the receiver through the direct and reflected links is given in Equation 1.

$$y=(h_{d,s}^\dagger+x^\dagger H_r G_S)wd+z, \quad \text{Equation 1}$$

where H$_r$=diag(h$_r^\dagger$), and z denotes the additive white Gaussian noise at the receiver (300) with zero mean and variance $\sigma^2$.

Consider, the transmitter (100) knows a direct link channel gain vector h$_d^\dagger$ of a link channel between the transmitter (100) and the receiver (300), and a cascaded gain matrix H$_r$G of a reflected link channel. The transmitter (100) uses a two-phase method to estimate these channel gains at the transmitter (100) using pilot symbols sent from the receiver (300). In the first phase, the IRS (200) is turned off and the transmitter (100) estimates a direct link channel gain. In the second phase, the IRS (200) is turned on and the transmitter (100) estimates the sum of the direct link channel gain and a reflected link channel gain, which can be done by either turning on only one of the IRS reflectors at a time or turning all the IRS reflectors and using rows of a Discrete Fourier transform (DFT) matrix as passive beamforming vector. Individual channel gains of the transmitter (100) to the IRS (200), and the IRS (200) to the receiver (300), which are difficult to obtain due to passive nature of the IRS (200), are not assumed at the transmitter (100). Furthermore, no CSI is assumed at the IRS (200) or the receiver (300). The transmitter (100) computes the passive beamforming vector x based on this CSI acquired and communicates to the IRS (200) controller through a control link.

From Equation 1, an instantaneous Signal-to-Noise Ratio (SNR) at the receiver (300), when the transmitter (100) transmits using subset S with transmit beamforming vector w and the IRS (200) employs the passive beamforming vector x is given in Equation 2.

$$SNR(S,w,x)=|(h_{d,s}^\dagger+x^\dagger H_r G_S)w|^2/\sigma^2 \quad \text{Equation 2}$$

Let R(S,w,x) denotes an instantaneous rate as given in Equation 3.

$$R(S,w,x)=\log_2(1+SNR(S,w,x)) \quad \text{Equation 3}$$

Similarly, a symbol error probability SEP(S,w,x) at the receiver (300) is given in Equation 4.

$$SEP(S,w,x)=c_1 \exp(-c_2 SNR(S,w,x)) \quad \text{Equation 4}$$

From the Equation 4, it is clear that maximizing instantaneous SNR will maximize the instantaneous rate and minimizes the symbol error probability. The primary objective of implementing the proposed disclosure is to maximizing the SNR at the receiver (300). The transmitter (100) is subject to a peak transmit power constraint, which limits a total instantaneous power from the N$_{RF}$ antennas selected to be below a maximum total transmit power P$_{max}$ allowed, i.e., $\|w\|^2 \le P_{max}$. The reflection loss $\beta$ is set as 1 as the goal is to maximize the signal power. Hence, the modulus of each reflection coefficient at the IRS (200) is one, i.e., $|x_n|=1$, $\forall$n, which is generally referred as a unit modulus constraint. Another goal is to jointly solve for subset of antennas S, the transmit beamforming vector w at the transmitter (100), and the passive beamforming vector x at the IRS (200) to maximize the receive SNR subject to the peak transmit power constraint and the unit modulus constraint. The optimization is over a space of discrete sets of size N$_{RF}$, complex vectors $\{w \in \mathbb{C}^{N_{RF} \times 1}: \|w\|^2 \le P_{max}\}$, and $\{x \in \mathbb{C}^{N \times 1}: |x_1|=1, \ldots, |x_N|=1\}$. Optimization P required in the system can be written as in Equation 5.

Equations 5–7

$$\mathcal{P}: \max_{S,w,x} |(h_{d,S}^\dagger + x^\dagger H_r G_S)w|^2, \quad (5)$$

$$\text{s.t. } \|w\|^2 \le P_{max}, \quad (6)$$

$$|x_n| = 1, \forall n = 1, \ldots, N. \quad (7)$$

The optimization P is non-convex in nature as the objective function is non-concave and unit-modulus constraint is non-convex. The proposed method provides the optimization P for single antenna selection (N$_{RF}$=1) scenario, and subset antenna selection (N$_{RF}$>1) scenario with lower channel estimation overhead and computational complexity.

Figure 4:
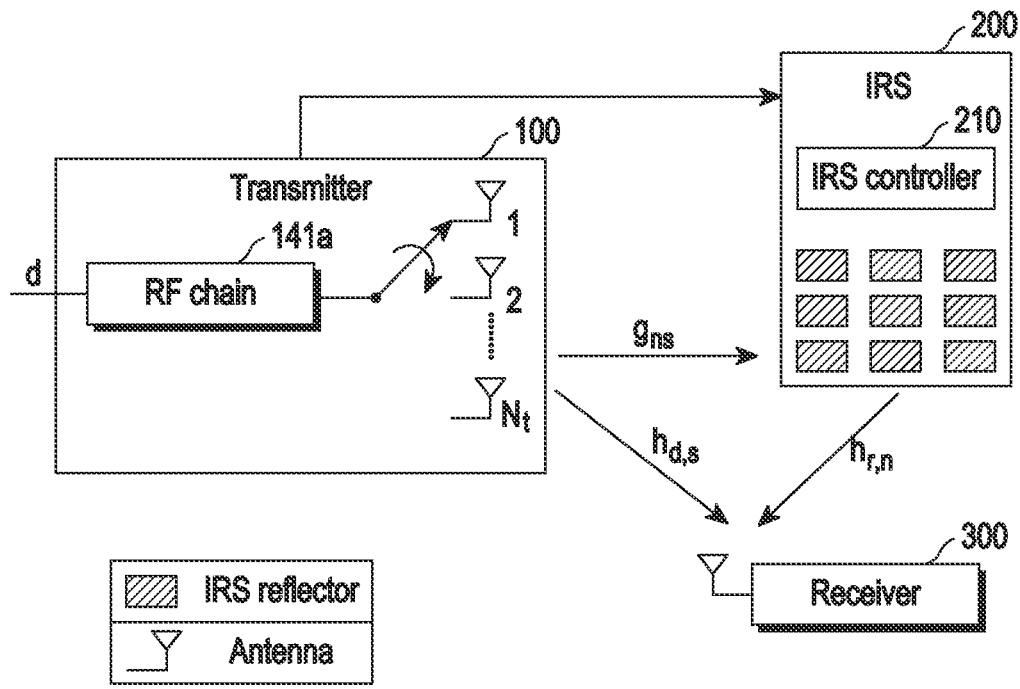
FIG. 4 is a schematic diagram illustrating single antenna selection and passive beamforming for delivering the signal to a receiver according to an embodiment of the disclosure.

FIG. 4 is a schematic diagram illustrating single antenna selection and passive beamforming for delivering a signal to a receiver according to an embodiment of the disclosure.

Referring to FIG. 4, let s $\in \{1, 2, \ldots, N_t\}$ denotes an index of the antenna selected. Here, the received signal in Equation 1 reduces as in Equation 8.

Equation 8

$$y = \left(h_{d,s}^* + \sum_{n=1}^{N} h_{r,n}^* g_{ns} x_n \right) w_s d + z. \quad (8)$$

For the IRS (200) assisted communication system with single antenna selection at the transmitter (100), the optimal antenna s*, the transmit power w$_s$*, and the reflection coefficient x$_n$* for optimal passive beamforming are given in Equations 9, 10 and 11 respectively.

Equations 9–11

$$s^* = \underset{k \in \{1,2,\ldots,N_t\}}{\mathrm{argmax}} \left\{ |h_{d,k}| + \sum_{n=1}^{N} |h_{r,n}^* g_{nk}| \right\}, \quad (9)$$

$$w_s^* = \sqrt{P_{max}}, \quad (10)$$

$$x_n^* = \exp(j[\arg(h_{d,s^*}^*) - \arg(h_{r,n}^* g_{ns^*}^*)]), \forall n. \quad (11)$$

A selection metric of each antenna is the sum of the absolute values of the direct link and the N reflected link channel gains. The optimal antenna is the one with the highest selection metric and the method of selecting the optimal antenna is called as optimal AS method. The optimal reflection coefficient of each IRS reflector depends on the difference between the phase of the direct link and the reflected link. Optimal antenna depends only on the absolute values of the channel gains, whereas the optimal reflection coefficient depends only on their phases.

Figure 5A:
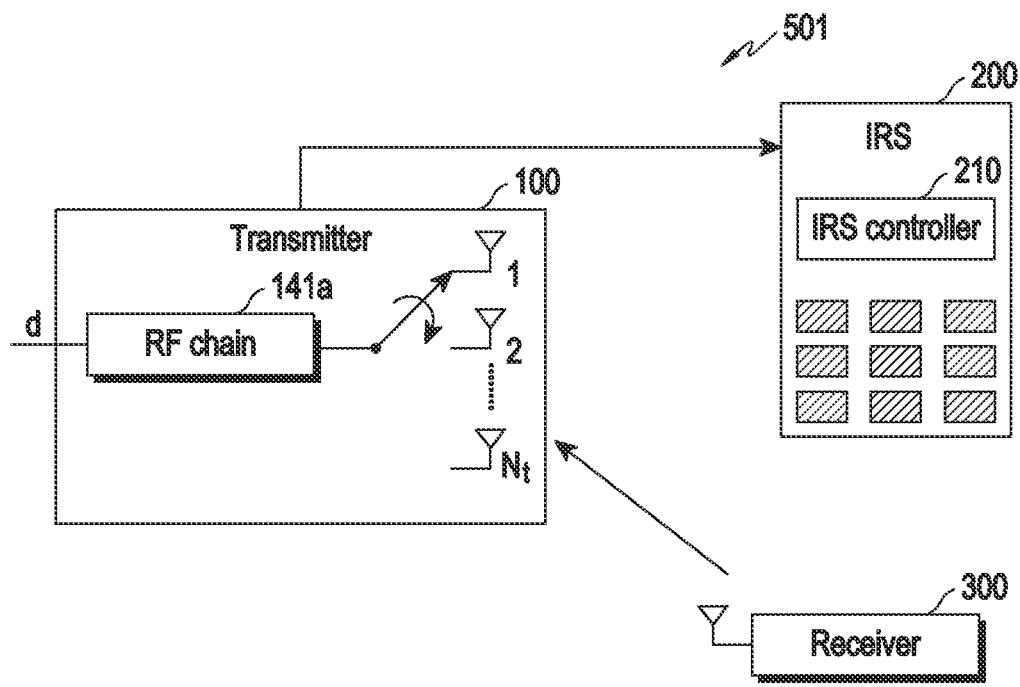
FIG. 5A and FIG. 5B are schematic diagrams illustrating a method of estimation of a direct link channel gain and a reflected link channel gain according to an embodiment of the disclosure.
Figure 5B:
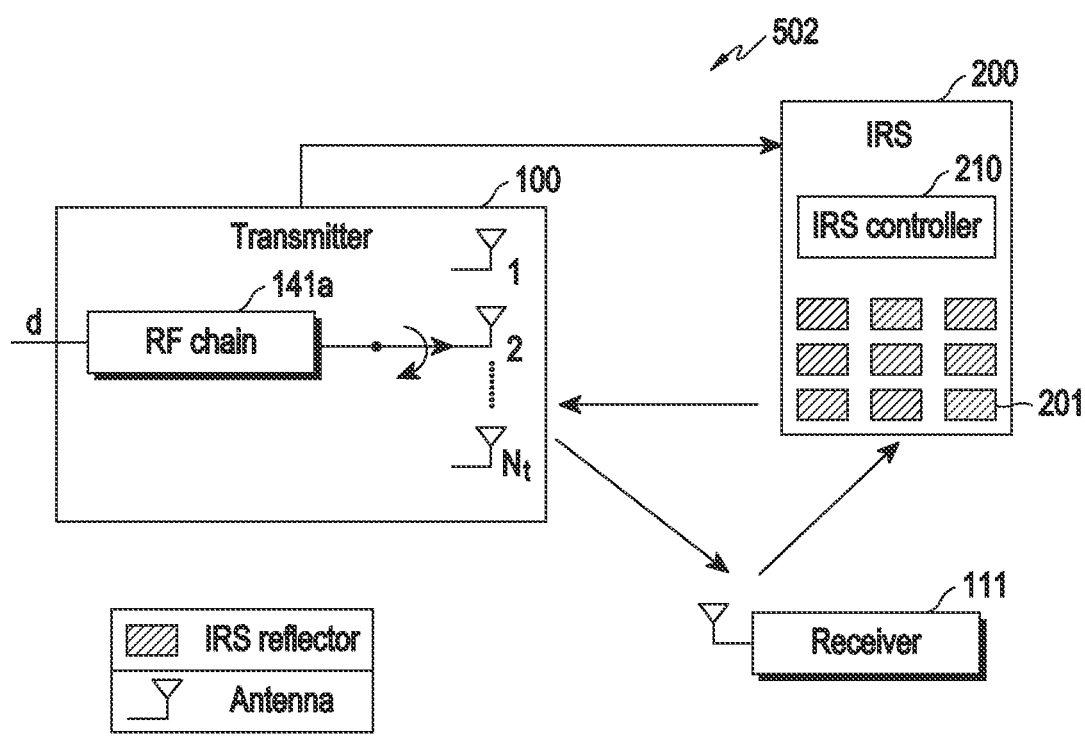

FIG. 5A and FIG. 5B are schematic diagrams (501, 502) illustrating a method of estimation of a direct link channel gain and a reflected link channel gain according to an embodiment of the disclosure.

Referring to FIG. 5A and FIG. 5B, the transmitter (100) uses the two phase method to estimate the direct link channel gain and the reflected link channel gain using the pilot symbols sent from the receiver (300). In the first phase, the IRS (200) is turned off, i.e., $\beta_n$=0, and the transmitter (100)

estimates the direct link channel gain by transmitting $N_t$ pilots to measure $N_t$ antennas. In the second phase, the IRS (200) is turned on and the transmitter (100) estimates the reflected link channel gain by transmitting $N_t N$ pilots. The transmitter (100) has only one RF chain. Hence, the transmitter (100) switches the RF chain to each antenna for estimating the channel gains. Hence, the receiver (300) needs to transmit $N_t$ pilots in the first phase to estimate the direct link channel gain and $N_t N$ pilots in the second phase to estimate the reflected link channel gain. Total, $N_t + N_t N$ pilots are used by the transmitter (100). Furthermore, $O(N_t N + N_t)$ computations are required to select the optimal antenna and compute its optimal reflection coefficients.

In an embodiment of the disclosure, an improved pilot transmission scheme is proposed in this disclosure, where the improved pilot transmission scheme includes three phases are described as follows. In first phase, the IRS (200) is powered off ($\beta_n = 0$) and the transmitter (100) measures the direct link channel gain. In second phase, the IRS (200) is powered on and the transmitter (100) measures the reflected link channel gain. Further, the transmitter (100) configures $x_n = 1$ by setting $\beta_n = 1$ and $\theta_n = 0$. The transmitter (100) transmits one pilot signal for transmit antenna instead of $N_t N$. This will still enable the measurement of absolute reflected channel gain per transmit antenna for the antenna selection. In third phase, the transmitter (100) transmits N pilot signals to the receiver (300) through the IRS reflector for estimating the channel gain from the selected transmit antenna. Th number of pilots used of measuring the direct link channel gain, the reflected link channel gain, and the phase are $N_t$, $N_t$, N. Total $2N_t + N$ pilot signals are used, which reduces the overall computational complexity.

In another embodiment of the disclosure, the method reduces both channel estimation overhead and computational complexity by selecting the antennas that maximizes the quantity (i.e., $|h_{d,k}| + |\Sigma_{n=1}^{N} h_{r,n}^* g_{nk}|$ sum of absolute channel gains from the transmitter (100) to the receiver (300) and the absolute value of sum of composite channel gains from the transmitter (100) to the IRS (200), and the IRS (200) to the receiver (300)) is called as a Low complexity AS (LAS) rule, which lower bounds the optimal selection metric of the antenna k given in Equation 9 to form the Equation 12. Then, the reflection coefficient computed as per Equation 11 for the antenna selected is given in Equation 13. The IRS reflectors are configured by choosing the phase factor of each IRS reflector to be difference in the phase of selected antenna channel from the transmitter (100) to the receiver (300) and the phase of the composite channel from the transmitter (100) to the IRS (200) and the IRS (200) to the receiver (300).

Equations 12-13

$$s = \underset{k \in \{1,2,\ldots,N_t\}}{\operatorname{argmax}} \left\{ |h_{d,k}| + \left| \sum_{n=1}^{N} h_{r,n}^* g_{nk} \right| \right\}, \quad (12)$$

$$x_n = \exp(j[\arg(h_{d,s}^*) - \arg(h_{r,n}^* g_{ns})]), \forall n. \quad (13)$$

For each antenna k, the transmitter (100) only needs to know sum of the reflected link channel gains, which can be estimated directly by sending one pilot from the receiver (300) and configuring $x_n = 1$, $\forall n$. Thus, the receiver (300) only needs to send $N_t$ pilots to obtain $\Sigma_{n=1}^{N} h_{r,n}^* g_{nk}$, for $k \in \{1, 2, \ldots, N_t\}$ instead of $N_t N$ pilots required for the selection metric of the optimal rule. Furthermore, N reflected link channel gains $h_{r,1}^* g_{1s}, \ldots, h_{r,N}^* g_{Ns}$ corresponding to the selected antenna is needed to compute $x_n$, which needs N pilots. Thus, only $2N_t + N$ pilots are needed instead of $N_t + N_t N$ pilots. Thus, the method reduces the channel estimation overhead significantly. Furthermore, $O(N_t + N)$ computations are only required for the AS and determining the reflection coefficients.

With reference to the FIG. 1, the method of selecting the optimal set of antenna is describe as follows. For a given subset S of antenna and the passive beamforming vector x, the optimal beamforming vector $w_{opt}$ at the transmitter (100) is given by Maximal Ratio Transmission (MRT) in Equation 14.

Equation 14

$$w_{opt} = \sqrt{P_{max}} \frac{h_{d,S} + G_S^\dagger H_r^\dagger x}{\|h_{d,S} + G_S^\dagger H_r^\dagger x\|}. \quad (14)$$

Substituting Equation 14 to Equation 5 yields signal power as $P_{max} \|x^\dagger H_r G_S + h_{d,S}^\dagger\|^2$.

Thus, for a given subset S, the transmitter (100) determines x that maximizes the signal power by solving the following optimization problem given in Equation 15.

$$\mathcal{P}_S: \max_x \|x^\dagger H_r G_S + h_{d,S}^\dagger\|^2 \quad \text{Equation 15}$$

$$\text{s.t. } |x_n| = 1, \forall n = 1, \ldots, N \quad \text{Equation 16}$$

The objective function in $P_S$ is quadratic in x and is convex. However, the unit modulus constraint is non-convex. Hence, standard convex optimization techniques cannot be employed. The unit modulus constraint above defines a Riemannian manifold. Hence, the $P_S$ can be efficiently solved by a manifold optimization technique and an alternating optimization technique.

Manifold Optimization Based Subset Selection (MOBSS) method is the manifold optimization techniques used by the transmitter (100). For each $S \in S$, $P_S$ can be solve using the MOBSS method in order to obtain passive beamforming vector $z_S$ and corresponding signal power. The optimal subset $S_{opt}$ is the one that yields maximum signal power and the optimal passive beamforming vector $x_{opt} = z_{Sopt}$. The optimal beamforming vector $w_{opt}$ is further determined by substituting $S_{opt}$ and $x_{opt}$ in the Equation 14. The MOBSS method is based on exhaustive search. Steps in the MOBSS method is given below.

Step-1: Transmitter (100) estimates $N_t$ direct link and $N_t N$ reflected link channel gains.
Step-2: For all $S \in S$ do
  obtain $z_S$ that solves $P_S$ using manifold optimization technique.
Step-3: End for
$S_{opt} = \operatorname{argmax} S \in S \{\|z_S^\dagger H_r G_S + h_{d,S}^\dagger\|^2\}$.
Step-4: $x_{opt} = z_{Sopt}$.
Step-5: Compute $w_{opt}$ by substituting $S_{opt}$ and $x_{opt}$ in the Equation 14.
Step-6: Return $S_{opt}, w_{opt}, x_{opt}$.

The transmitter (100) has $N_{RF}$ RF chains. Thus, $\lceil N_t/N_{RF} \rceil$ number of pilots are needed to estimate $N_t$ direct link channel gains and $\lceil N_t/N_{RF} \rceil N$ pilots for the reflected link channel gains. This MOBSS method solves $P_S$ for each $S \in S$, which contains $O(N_t^{N_{RF}})$ elements. For each element, the transmitter (100) solves optimization problem using the MOBSS method, which needs $O(N^x)$ computations. Hence, total computational complexity is $O(N_t^{N_{RF}} N^x)$.

Alternating Optimization Based Subset Selection (AOBSS) method is the alternating optimization technique used by the transmitter (100). To reduce the computational complexity involved in the MOBSS method, the transmitter (100) develops a subset selection method based on sorting. For each antenna k, the transmitter (100) first computes the selection metric of the LAS rule in Equation 12, i.e., $|h_{d,k}|+|\Sigma_{n=1}^{N} h_{r,n}^* g_{nk}|$ and sorts them in descending order. Then the transmitter (100) selects the first $N_{RF}$ antennas from the sorted list as subset S to transmit. For this subset S, the transmitter (100) solves for w and x iteratively using the AOBSS method. The transmitter (100) initializes w with the MRT based beamforming vector in the direction of the direct link, i.e., $\sqrt{(P_{max} h_{d,S}/\|h_{d,S}\|)}$. For the given subset S and the beamforming vector w, $h_{d,S}^\dagger w$ is the effective direct link channel gain from the transmitter (100) to the receiver (300). Similarly, $[G_S w]_n$ is the effective channel gain from the transmitter (100) to the $n^{th}$ IRS reflector. For these effective channel gains, from the Equation 11, the transmitter (100) know that the optimal passive beamforming reflection coefficient is given by $$x_n = \exp(j \arg(h_{d,S}^\dagger w) - j \arg(h_{r,n}^*[G_S w]_n)), \forall n. \quad \text{Equation 17}$$

The transmitter (100) then updates w by substituting the above computed passive beamforming vector in Equation 14. Then the transmitter (100) computes the optimal x for this updated w and continues the iterations till convergence. Here, in each iteration, the transmitter (100) alternatively optimizes x for the given w and then optimizes w for the given x. Steps in the alternating optimization based low-complexity subset antenna selection method are given below.

Step 1: Estimate CSI required to compute the selection metrics.

Step 2: Sort the selection metrics $|h_{d,k}|+|\Sigma_{n=1}^{N} h_{r,n}^* g_{nk}|$, for $k \in \{1, 2, \ldots, N_t\}$ in the descending order.

Step 3: Assign indices of first $N_{RF}$ antennas in the sorted list to the subset S.

Step 4: Estimate the reflected link CSI corresponding to the subset of antennas selected.

Step 5: Initialize m=0, $w^1 = \sqrt{(P_{max} h_{d,S}/\|h_{d,S}\|)}$.

while (SNR improvement>$\epsilon$) and (m≤MAXITER) do

Update $m = m + 1$.

$$x_n = \exp(j \arg(h_{d,S}^\dagger w^m) - j \arg(h_{r,n}^*[G_S w^m]_n)).$$

$$x^m = [x_1, x_2, \ldots, x_N].$$

$$w^{m+1} = \sqrt{P_{max}} \frac{h_{d,S} + G_S^\dagger H_r^\dagger x^m}{\|h_{d,S} + G_S^\dagger H_r^\dagger x^m\|}.$$

end while.

Step 6: $x_n = \exp(j \arg(h_{d,S} w^{m+1}) - j \arg(h_{r,n}^*[G_S w^{m+1}]_n))$.

Step 7: $x^{m+1} = [x_1, x_2, \ldots, x_N]$.

Step 8: return S, $w^{m+1}$, and $x^{m+1}$.

Also in the AOBSS method, similar to MOBSS method, the transmitter (100) uses $\lceil N_t/N_{RF} \rceil$ pilots for the direct link CSI. However, the transmitter (100) employs the selection metric from the LAS rule, and needs $\lceil N_t/N_{RF} \rceil$ pilots to obtain the reflected link CSI required to compute the selection metrics and N pilots to compute the IRS (200) reflection coefficients. In total, the transmitter (100) uses $2\lceil N_t/N_{RF} \rceil + N$ pilots. Then, $O(N_t \log(N_t))$ computations are required to select the subset and O(N) computations per iteration is required to compute w and x. Thus, the AOBSS method reduces the computational complexity and the number of pilot transmissions required significantly compared to the MOBSS method. Table I compares the computational complexity and number of pilot transmissions required for the proposed method with an existing Semi-Definite Relaxation (SDR) method.

TABLE 1

|  | Computational complexity | Pilot transmissions |
| --- | --- | --- |
| Optimal AS | $O(N_tN)$ | $N_t + N_tN$ |
| LAS | $O(N_t + N)$ | $2N_t + N$ |
| Manifold | $O((N_t)^{N_{RF}} N^x)$ | $\lceil \frac{N_t}{N_{RF}} \rceil + \lceil \frac{N_t}{N_{RF}} \rceil N$ |
| AOBS | $O(N_t \log(N_t) + N)$ | $2\lceil \frac{N_t}{N_{RF}} \rceil + N$ |
| SDR [5] | $O((N + 1)^6)$ | $N + 1$ |

Figure 6:
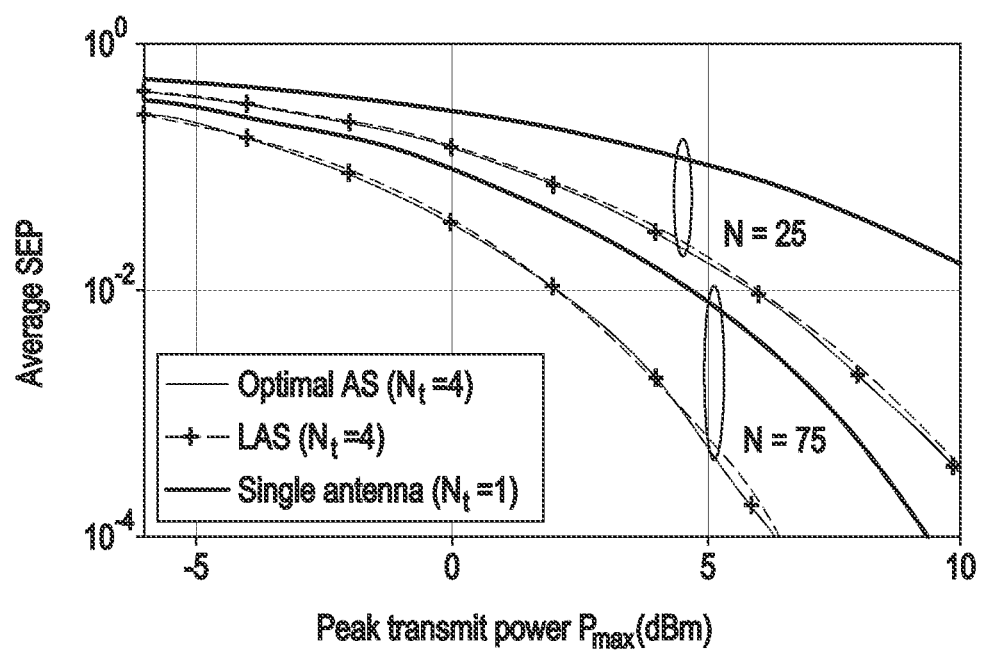
FIG. 6 is a graphical diagram illustrating plotting of an average symbol error probability (SEP) as a function of a peak transmit power for different numbers of the IRS reflectors according to an embodiment of the disclosure.

FIG. 6 is a graphical diagram illustrating plotting of an average symbol error probability (SEP) as a function of a peak transmit power ($P_{max}$) for different number of the IRS reflectors according to an embodiment of the disclosure. In an example scenario, a uniform linear array with half-wavelength antenna spacing at the transmitter (100) and a uniform planner array at the IRS (200) is used to evaluate the performance of the proposed methods. The transmitter (100) and the IRS (200) are placed such that there is a dominant Line-of-Sight (LOS) component between them. Thus, the channel gain between the transmitter (100) and the IRS (200) is modeled as in Equation 18.

Equation 18

$$G = \sqrt{\frac{K}{K+1}} G_{LOS} + \sqrt{\frac{1}{K+1}} G_{NLOS}, \quad (18)$$

where $G_{LOS}$ and $G_{NLOS}$ denote the LOS and non-LOS components respectively. K denotes Rician factor, which K is set to 10. Independent Rayleigh fading is considered for $G_{NLOS}$, the direct link from the transmitter (100) to the receiver (300), and the link from the IRS (200) to the receiver (300) in the example scenario. Let $d_{bi}$, $d_{bu}$, and $d_{iu}$ denote the distances from the transmitter (100) to the IRS (200), the transmitter (100) to the receiver (300), and the IRS (200) to the receiver (300) respectively. Path-loss from the transmitter (100) to the IRS (200), the transmitter (100) to the receiver (300), and the IRS (200) to the receiver (300) are taken to be $16.6+22 \log_{10}(d_{bi})$, $35+30 \log_{10}(d_{bu})$, and $20+30 \log_{10}(d_{iu})$ respectively. The $\sigma^2$ is set as −80 dBm.

Referring to FIG. 6, the performance of the optimal AS method and the LAS rule are compared. The average SEP decreases as $P_{max}$ increases as the transmitter (100) is allowed to transmit with higher power. The LAS rule with low computational complexity and channel estimation overhead, is near-optimal. In addition, the average SEP of the transmitter (100) with the single antenna is significantly higher than the transmitter (100) with four antennas and one RF chain. For example, at $P_{max}$=6 dB, the average SEP is higher by a factor of 8.1 and 23.8, for N=25 and N=75, respectively. Furthermore, a significant reduction in the average SEP as N increases. At $P_{max}$=6 dB, the average SEP for N=75 is lower by a factor of 58.1 than for N=25.

Figure 7:
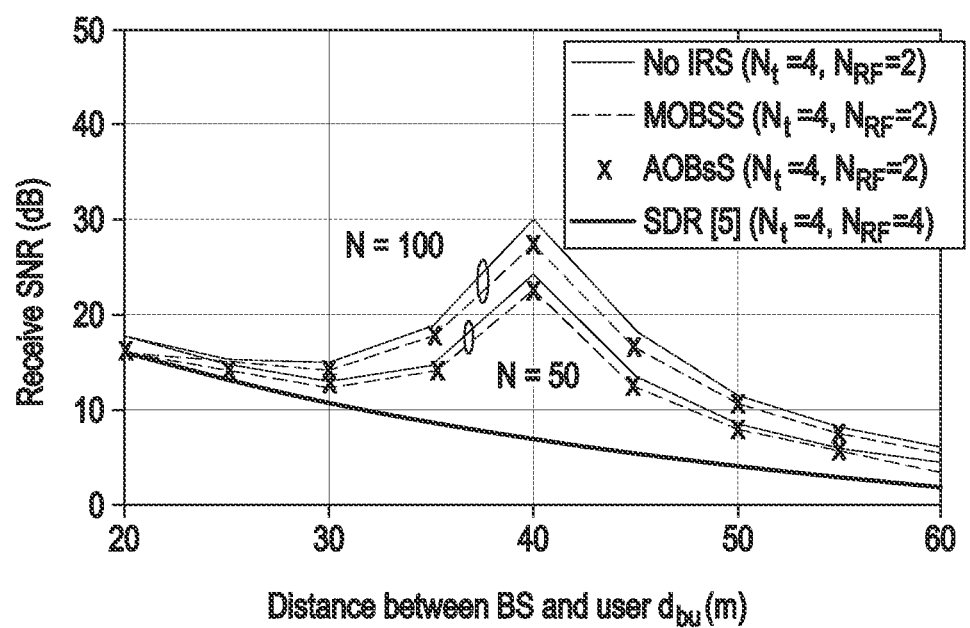
FIG. 7 is a graphical diagram illustrating plotting of signal-to-noise ratio (SNR) at a receiver as a function of distance of the receiver from a transmitter for different number of the IRS reflectors according to an embodiment of the disclosure.

FIG. 7 is a graphical diagram illustrating plotting of a SNR at a receiver as a function of distance $d_{bu}$ of a receiver from a transmitter for different number of an IRS reflectors according to an embodiment of the disclosure.

Referring to FIG. 7, the distance between the transmitter (100) and the IRS (200) $d_{bi}$ is fixed to 40 meters and the receiver (300) moves parallel to a line joining the transmitter (100) and the IRS (200). The SNR performance of the proposed subset antenna selection methods are compared when $N_t$=4 and $N_{RF}$=2, with the SDR based beamforming techniques that require all four RF chains. In addition, the SNR decreases as $d_{bu}$ increases when there is no IRS (200). However, with the IRS (200), the SNR initially decreases as $d_{bu}$ increases and then increases till $d_{bu}$=40 m. This happens because the receiver (300) moves closer to the IRS (200) as the receiver (300) moves away from the transmitter (100), which makes the reflected link stronger. Furthermore, the SNR decreases for $d_{bu}$>40 meters as the receiver (300) moves away from both the transmitter (100) and the IRS (200). The SNR is maximum when the receiver (300) is close to the IRS (200). The maximum benefit of increasing N occurs at $d_{bu}$=40 meters, where the SNR increases by 6 dB by doubling the number of the IRS (200) reflectors. Thus, the placement of the IRS (200) plays a key role in the SNR performance. The performance of the AOBSS method is very close to the MOBSS method in spite of its very low complexity and channel estimation overhead. In addition, the proposed methods can achieve the SNR close to the SDR based beamforming technique that needs two additional RF chains. Loss in the SNR due to less hardware is only 1.72 dB and 2.2 dB, for N=50 and N=100, respectively, at $d_{bu}$=40 m.

Figure 8:
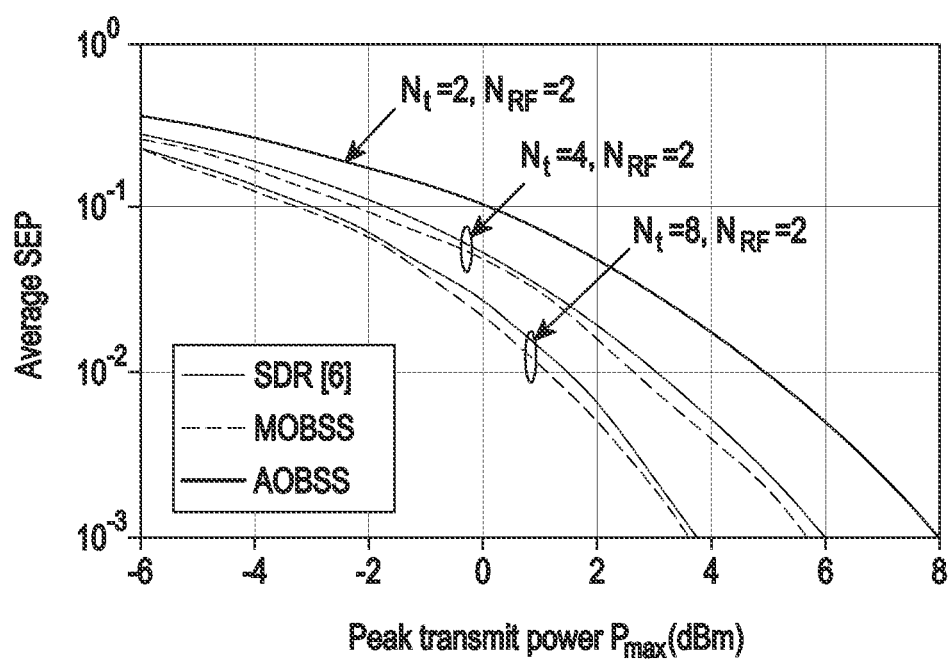
FIG. 8 is a graphical diagram illustrating plotting of an average SEP as the function of a peak transmit power for different numbers of antennas at a transmitter according to an embodiment of the disclosure.

FIG. 8 is a graphical diagram illustrating plotting of an average SEP as a function of a peak transmit power for different number of antennas at a transmitter according to an embodiment of the disclosure. The $N_{RF}$ is set as 2 for this plotting.

Referring to FIG. 8, the average SEP performance of the MOBSS method with the AOBSS method is compared in the FIG. 8, which are so close. The AOBSS method is a simpler yet near-optimal subset selection method. The average SEP decrease significantly by increasing the number of antennas with the same number of RF chains. For example, at $P_{max}$=4 dBm, it reduces by a factor of 3.6 and 24.4 when $N_t$=4 and $N_t$=8, respectively.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for enhancing power of a signal in a wireless communication system using an intelligent reflecting surface (IRS) comprising reflectors, the method comprising:
estimating, by a transmitter of the wireless communication system, a channel gain by transmitting a pilot signal to a receiver through at least one antenna from a plurality of antennas of the transmitter and the IRS;
determining, by the transmitter, an antenna selection metric based on the channel gain in transmitting the pilot signal to the receiver through the at least one antenna from the plurality of antennas of the transmitter and the IRS;
identifying, by the transmitter, the at least one antenna from the plurality of antennas that causes to provide the largest antenna selection metric;
determining, by the transmitter, a reflection coefficient for each reflector of the IRS based on the identified antenna;
configuring, by the transmitter, the reflectors of the IRS with the reflection coefficient; and
transmitting, by the transmitter, the signal to the receiver through the at least one identified antenna and the configured reflectors.

2. The method of claim 1, wherein the determining of the antenna selection metric comprises:
estimating, by the transmitter, a first channel gain by transmitting the pilot signal to the receiver through the at least one antenna from the plurality of antennas of the transmitter and the IRS, wherein the reflection coefficient for each reflector of the IRS is set as zero;
estimating, by the transmitter, a second channel gain by transmitting the pilot signal to the receiver through the at least one antenna from the plurality of antennas and the IRS, wherein the reflection coefficient for each reflector of the IRS is set as one;
determining, by the transmitter, a difference between the second channel gain and the first channel gain for the at least one antenna; and
identifying, by the transmitter, the at least one antenna from the plurality of antennas that has a maximum of sum of a magnitude of the first channel gain and a magnitude of the difference between the second channel gain and the first channel gain.

3. The method of claim 2,
wherein the estimating, by the transmitter, the first channel gain by transmitting a pilot signal to the receiver through the at least one antenna from the plurality of antennas of the transmitter and the IRS, and
wherein the reflection coefficient for each reflector of the IRS is set as zero, comprises:
receiving, by the receiver, the pilot signal from the at least one antenna of the plurality of antennas of the transmitter, wherein the IRS is disabled,
determining, by the receiver, a location of the pilot signal based on a time and a frequency of the pilot signal, in response to receiving the pilot signal,
estimating, by the receiver, the first channel gain based on the pilot signal, and
reporting, by the receiver, the first channel gain to the transmitter.

4. The method of claim 2,
wherein the estimating, by the transmitter, the second channel gain by transmitting the pilot signal to the receiver through the at least one antenna from the plurality of antennas and the IRS, and
wherein the reflection coefficient for each reflector of the IRS is set as one, comprises:
receiving, by the receiver, the pilot signal from the at least one antenna of the plurality of antennas of the transmitter, wherein the IRS is enabled and the reflection coefficient is set as one,
determining, by the receiver, a location of the pilot signal based on a time and a frequency of the pilot signal, in response to receiving the pilot signal,
estimating, by the receiver, the second channel gain based on the pilot signal, and
reporting, by the receiver, the second channel gain to the transmitter.

5. The method of claim 1, further comprising:
determining, by the transmitter, an optimal beamforming required for transmitting the signal from the at least one antenna based on the reflection coefficient and the at least one antenna; and
transmitting, by the transmitter, the signal to the receiver through the configured reflectors and the at least one antenna based on the optimal beamforming.

6. The method of claim 1, wherein the estimating of the channel gain comprises:
receiving, by the receiver, the pilot signal from the at least one antenna of the plurality of antennas of the transmitter, wherein the IRS is disabled;
determining, by the receiver, a location of the pilot signal based on a time and a frequency of the pilot signal, in response to receiving the pilot signal;
estimating, by the receiver, the channel gain based on the pilot signal when the IRS is disabled;
receiving, by the receiver, the pilot signal from the at least one antenna of the plurality of antennas of the transmitter, wherein the IRS is enabled and the reflection coefficient is set as one;
estimating, by the receiver, the channel gain based on the pilot signal when the IRS is enabled; and
reporting, by the receiver, the channel gain estimated while the IRS is disabled and enabled to the transmitter.

7. The method of claim 1, wherein the reflection coefficient comprises a phase shift (θ) and a magnitude of reflection loss (β).

8. The method of claim 1, wherein the estimating of the channel gain comprises:
monitoring, by the transmitter, the channel gain estimated for the at least one antenna at various instant of time;
training, by the transmitter, a machine learning (ML) engine to learn the estimated channel gain; and
predicting, by the transmitter, the channel gain in transmitting the pilot signal to the receiver through the at least one antenna based on the learning using the ML engine.

9. The method of claim 1, wherein the determining of the reflection coefficient for each reflector of the IRS comprises:
monitoring, by the transmitter, the reflection coefficient determined at various instant of time;
training, by the transmitter, a ML engine to learn the reflection coefficient determined at various instant of time; and
predicting, by the transmitter, the reflection coefficient for each reflector of the IRS based on the learning using the ML engine.

10. A method for enhancing power of a signal in a wireless communication system using an intelligent reflecting surface (IRS) comprising reflectors, the method comprising:
estimating, by a receiver, a channel gain by receiving a pilot signal from at least one antenna of a plurality of antennas of a transmitter and the IRS of the wireless communication system;
determining, by the receiver, an antenna selection metric based on the channel gain in receiving the pilot signal from the at least one antenna of the plurality of antennas of the transmitter and the IRS;
identifying, by the receiver, the at least one antenna from the plurality of antennas that causes to provide the largest antenna selection metric;
determining, by the receiver, a reflection coefficient for each reflector of the IRS based on the at least one identified antenna; and
reporting, by the receiver, the at least one identified antenna and the reflection coefficient for each reflector to the transmitter for configuring the reflectors of the IRS with the reflection coefficient and enabling the transmitter to transmit the signal through the at least one identified antenna.

11. The method of claim 10, wherein the estimating of the channel gain comprises:
receiving, by the receiver, the pilot signal from the at least one antenna of the plurality of antennas of the transmitter, wherein the IRS is disabled;
determining, by the receiver, a location of the pilot signal based on a time and a frequency of the pilot signal;
estimating, by the receiver, the channel gain based on the pilot signal when the IRS is disabled;
receiving, by the receiver, the pilot signal from the at least one antenna of the plurality of antennas of the transmitter, wherein the IRS is enabled and the reflection coefficient is set as one; and
estimating, by the receiver, the channel gain based on the pilot signal when the IRS is enabled.

12. The method of claim 10, wherein the determining of the antenna selection metric comprises:
estimating, by the receiver, a first channel gain by receiving the pilot signal from the at least one antenna of the plurality of antennas of the transmitter and the IRS of the wireless communication system, wherein the reflection coefficient for each reflector of the IRS is set as zero;
estimating, by the receiver, a second channel gain by receiving the pilot signal from the at least one antenna of the plurality of antennas and the IRS, wherein the reflection coefficient for each reflector of the IRS is set as one;
determining, by the receiver, a difference between the second channel gain and the first channel gain for the at least one antenna; and
identifying, by the receiver, the at least one antenna of the plurality of antennas that has a maximum of sum of a magnitude of first channel gain and a magnitude of the difference between the second channel gain and the first channel gain.

13. The method of claim 10, wherein the estimating of the channel gain comprises:
monitoring, by the receiver, the channel gain estimated for the at least one antenna on various instant of time;
training, by the receiver, a Machine Learning (ML) engine to learn the estimated channel gain; and
predicting, by the receiver, the channel gain in transmitting the pilot signal to the receiver through the at least one antenna based on the learning using the ML engine.

14. The method of claim 10, wherein the determining of the reflection coefficient for each reflector of the IRS comprises:
monitoring, by the receiver, the reflection coefficient determined at various instant of time;
training, by the receiver, a ML engine to learn the reflection coefficient determined at various instant of time; and
predicting, by the receiver, the reflection coefficient for each reflector of the IRS based on the learning using the ML engine.

15. A method for enhancing power of a signal in a wireless communication system using an intelligent reflecting surface (IRS) comprising reflectors, the method comprising:
estimating, by a transmitter of the wireless communication system, a first channel gain by transmitting a pilot signal to a receiver through each antenna from a plurality of antennas of the transmitter and the IRS, wherein a reflection coefficient for each reflector of the IRS is set as zero;

estimating, by the transmitter, a second channel gain by transmitting the pilot signal to the receiver through each antenna of the plurality of antennas and the IRS, wherein the reflection coefficient for each reflector of the IRS is set as one;

determining, by the transmitter, a difference between the second channel gain and the first channel gain for each antenna;

sorting, by the transmitter, each antenna in decreasing order of the difference between the second channel gain and the first channel gain for each antenna;

selecting, by the transmitter, top n number of antenna from the sorted antennas as a set of antennas;

transmitting, by the transmitter, the pilot signal through the selected set of antennas;

determining, by the transmitter, a reflection coefficient for each reflector of the IRS based on the set of antennas;

configuring, by the transmitter, the reflectors of the IRS with the reflection coefficient;

determining, by the transmitter, an optimal beamforming required for transmitting the signal from the set of antennas based on the reflection coefficient and the set of antennas; and transmitting, by the transmitter, the signal to the receiver through the configured reflectors and the set of antennas based on the optimal beamforming.

16. A method for enhancing power of a signal in a wireless communication system using an intelligent reflecting surface (IRS) comprising reflectors, the method comprising:

estimating, by a receiver, a first channel gain by receiving a pilot signal from each antenna of a plurality of antennas of a transmitter and the IRS of the wireless communication system, wherein a reflection coefficient for each reflector of the IRS is set as zero;

estimating, by the receiver, a second channel gain by receiving the pilot signal from each antenna of the plurality of antennas and the IRS, wherein the reflection coefficient for each reflector of the IRS is set as one;

determining, by the receiver, a difference between the second channel gain and the first channel gain for each antenna;

sorting, by the receiver, each antenna in decreasing order of the difference between the second channel gain and the first channel gain for each antenna;

selecting, by the receiver, top n number of antenna from the sorted antennas as a set of antennas;

determining, by the receiver, a reflection coefficient for each reflector of the IRS based on the set of antennas and the pilot signal transmitted by the transmitter; and reporting, by the receiver, the selected top n number of antenna and the reflection coefficient for each reflector to the transmitter for configuring the reflectors of the IRS with the reflection coefficient and enabling the transmitter to transmit the signal through the identified antenna.

17. A transmitter for enhancing power of a signal in a wireless communication system using an intelligent reflecting surface (IRS) comprising reflectors, the transmitter comprising:

a memory;
a communicator being equipped with a plurality of antennas and a plurality of radio frequency (RF) chains; and
a processing circuitry, coupled with the memory and the communicator, configured to:
estimate a channel gain by transmitting a pilot signal to a receiver through at least one antenna from the plurality of antennas of the transmitter and the IRS,
determine an antenna selection metric based on the channel gain in transmitting the pilot signal to the receiver through the at least one antenna from the plurality of antennas of the transmitter and the IRS,
identify the at least one antenna from the plurality of antennas that causes to provide the largest antenna selection metric,
determine a reflection coefficient for each reflector of the IRS based on the identified antenna,
configure the reflectors of the IRS with the reflection coefficient, and
transmit the signal to the receiver through the at least one identified antenna and the configured reflectors.

18. A receiver for enhancing power of a signal in a wireless communication system using an intelligent reflecting surface (IRS) comprising reflectors, the receiver comprising:

a memory;
a communicator being equipped with at least one receive antennas and at least one receive radio frequency (RF) chain; and
a processing circuitry, coupled with the memory and the communicator, configured to:
estimate a channel gain by receiving a pilot signal from at least one antenna of a plurality of antennas of a transmitter and the IRS of the wireless communication system,
determine an antenna selection metric based on the channel gain in receiving the pilot signal from the at least one antenna of the plurality of antennas of the transmitter and the IRS,
identify the at least one antenna from the plurality of antennas that causes to provide the largest antenna selection metric,
determine a reflection coefficient for each reflector of the IRS based on the at least one identified antenna, and
report the at least one identified antenna and the reflection coefficient for each reflector to the transmitter for configuring the reflectors of the IRS with the reflection coefficient and enabling the transmitter to transmit the signal through the at least one identified antenna.

19. A transmitter for enhancing power of a signal in a wireless communication system using an intelligent reflecting surface (IRS) comprising reflectors, the transmitter comprising:

a memory;
a communicator being equipped with a plurality of antennas and a plurality of radio frequency (RF) chains; and
a processing circuitry, coupled with the memory and the communicator, configured to:
estimate a first channel gain by transmitting a pilot signal to a receiver through each antenna from the plurality of antennas of the transmitter and the IRS, wherein a reflection coefficient for each reflector of the IRS is set as zero,
estimate a second channel gain by transmitting the pilot signal to the receiver through each antenna from the plurality of antennas and the IRS, wherein the reflection coefficient for each reflector of the IRS is set as one, determine a difference between the second channel gain and the first channel gain for each antenna, sort each antenna in decreasing order of the difference between the second channel gain and the first channel gain for each antenna, select top n number of antenna from the sorted antennas as a set of antennas, transmit the pilot signal through the selected set of antennas, determine a reflection coefficient for each reflector of the IRS based on the set of antennas, configure the reflectors of the IRS with the reflection coefficient, determine an optimal beamforming required for transmitting the signal from the set of antennas based on the reflection coefficient and the set of antennas, and transmit the signal to the receiver through the configured reflectors and the set of antennas based on the optimal beamforming.

20. A receiver for enhancing power of a signal in a wireless communication system using an intelligent reflecting surface (IRS) comprising reflectors, the receiver comprising:

a memory;

a communicator being equipped with at least one receive antennas and at least one receive radio frequency (RF) chain; and a processing circuitry, coupled with the memory and the communicator, configured to:

estimate a first channel gain by receiving a pilot signal from each antenna of a plurality of antennas of a transmitter and the IRS, wherein a reflection coefficient for each reflector of the IRS is set as zero, estimate a second channel gain by receiving the pilot signal from each antenna of the plurality of antennas and the IRS, wherein the reflection coefficient for each reflector of the IRS is set as one, determine a difference between the second channel gain and the first channel gain for each antenna, sort each antenna in decreasing order of the difference between the second channel gain and the first channel gain for each antenna, select top n number of antenna from the sorted antennas as a set of antennas, determine a reflection coefficient for each reflector of the IRS based on the set of antennas and the pilot signal transmitted by the transmitter, and report the selected top n number of antenna and the reflection coefficient for each reflector to the transmitter for configuring the reflectors of the IRS with the reflection coefficient and enabling the transmitter to transmit the signal through the identified antenna.

* * * * *